(12) United States Patent
Firminger et al.

(10) Patent No.: US 8,255,237 B2
(45) Date of Patent: *Aug. 28, 2012

(54) SOURCE USER BASED PROVISION OF ONE OR MORE TEMPLATES

(75) Inventors: Shawn P. Firminger, Redmond, WA (US); Jason Garms, Redmond, WA (US); Roderick A. Hyde, Redmond, WA (US); Edward K. Y. Jung, Bellevue, WA (US); Chris D. Karkanias, Sammamish, WA (US); Eric C. Leuthardt, St. Louis, MO (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/653,180

(22) Filed: Dec. 8, 2009

(65) Prior Publication Data
US 2011/0055705 A1 Mar. 3, 2011

Related U.S. Application Data

(63) Continuation-in-part of application No. 12/584,489, filed on Sep. 3, 2009, and a continuation-in-part of application No. 12/584,653, filed on Sep. 8, 2009, and a continuation-in-part of application No. 12/587,018, filed on Sep. 29, 2009, and a continuation-in-part of (Continued)

(51) Int. Cl.
*G06Q 10/00* (2012.01)
(52) U.S. Cl. ...................................................... 705/1.1
(58) Field of Classification Search .................. None
See application file for complete search history.

(56) References Cited

U.S. PATENT DOCUMENTS 4,853,854 A 8/1989 Behar et al.
(Continued)

OTHER PUBLICATIONS

U.S. Appl. No. 12/655,582, Firminger et al.
U.S. Appl. No. 12/655,581, Firminger et al.
U.S. Appl. No. 12/655,365, Firminger et al.
U.S. Appl. No. 12/655,250, Firminger et al.
U.S. Appl. No. 12/655,075, Firminger et al.
U.S. Appl. No. 12/653,972, Firminger et al.
U.S. Appl. No. 12/653,387, Firminger et al.
U.S. Appl. No. 12/653,386, Firminger et al.

(Continued)

*Primary Examiner* — Jonathan Ouellette

(57) ABSTRACT

A computationally implemented method includes, but is not limited to: receiving one or more requests for one or more particular templates that are associated with one or more source users, the one or more particular templates designed to facilitate one or more end users to achieve one or more target outcomes when one or more emulatable aspects included in the one or more particular templates are emulated; and providing from a plurality of templates the one or more particular templates, the providing being based at least on the association of the one or more particular templates with the one or more source users, the one or more particular templates developed based on one or more reported aspects associated with the one or more source users In addition to the foregoing, other method aspects are described in the claims, drawings, and text forming a part of the present disclosure.

45 Claims, 14 Drawing Sheets

Related U.S. Application Data application No. 12/587,127, filed on Sep. 30, 2009, and a continuation-in-part of application No. 12/590,027, filed on Oct. 29, 2009, and a continuation-in-part of application No. 12/590,039, filed on Oct. 30, 2009, and a continuation-in-part of application No. 12/590,600, filed on Nov. 10, 2009, and a continuation-in-part of application No. 12/590,841, filed on Nov. 12, 2009, and a continuation-in-part of application No. 12/592,075, filed on Nov. 17, 2009, and a continuation-in-part of application No. 12/592,161, filed on Nov. 18, 2009, and a continuation-in-part of application No. 12/592,544, filed on Nov. 24, 2009, and a continuation-in-part of application No. 12/592,548, filed on Nov. 25, 2009, and a continuation-in-part of application No. 12/592,944, filed on Dec. 3, 2009, and a continuation-in-part of application No. 12/592,946, filed on Dec. 4, 2009, and a continuation-in-part of application No. 12/653,117, filed on Dec. 7, 2009.

(56) References Cited

U.S. PATENT DOCUMENTS

| | | | |
|---|---|---|---|
| 5,961,446 | A | 10/1999 | Beller et al. |
| 6,338,044 | B1 | 1/2002 | Cook et al. |
| 6,353,447 | B1 | 3/2002 | Truluck et al. |
| 6,842,604 | B1 | 1/2005 | Cook et al. |
| 7,587,368 | B2 | 9/2009 | Felsher |
| 7,668,735 | B2 | 2/2010 | Grace et al. |
| 7,702,685 | B2 | 4/2010 | Shrufi et al. |
| 7,860,852 | B2 | 12/2010 | Brunner et al. |
| 7,908,182 | B1 | 3/2011 | Gupta |
| 7,959,567 | B2 | 6/2011 | Stivoric et al. |
| 8,005,906 | B2 | 8/2011 | Hayashi et al. |
| 2002/0107707 | A1 | 8/2002 | Naparstek et al. |
| 2004/0015337 | A1* | 1/2004 | Thomas et al. .......... 703/11 |
| 2005/0197553 | A1 | 9/2005 | Cooper |
| 2005/0216300 | A1 | 9/2005 | Appelman et al. |
| 2006/0036619 | A1* | 2/2006 | Fuerst et al. .......... 707/100 |
| 2007/0088576 | A1 | 4/2007 | de Beus et al. |
| 2008/0091471 | A1 | 4/2008 | Michon et al. |
| 2008/0288425 | A1* | 11/2008 | Posse et al. .......... 706/12 |
| 2008/0294012 | A1* | 11/2008 | Kurtz et al. .......... 600/300 |
| 2009/0044113 | A1 | 2/2009 | Jones et al. |
| 2009/0070679 | A1 | 3/2009 | Shen et al. |
| 2009/0075242 | A1 | 3/2009 | Schwarzberg et al. |
| 2009/0076335 | A1 | 3/2009 | Schwarzberg et al. |
| 2009/0100469 | A1 | 4/2009 | Conradt et al. |
| 2009/0176526 | A1* | 7/2009 | Altman .......... 455/556.1 |
| 2009/0258710 | A1* | 10/2009 | Quatrochi et al. .......... 463/43 |
| 2009/0271247 | A1 | 10/2009 | Karelin et al. |
| 2009/0292814 | A1 | 11/2009 | Ting et al. |
| 2009/0299990 | A1* | 12/2009 | Setlur et al. .......... 707/5 |
| 2009/0313041 | A1* | 12/2009 | Eder .......... 705/2 |
| 2009/0319288 | A1 | 12/2009 | Slaney et al. |
| 2009/0326981 | A1* | 12/2009 | Karkanias et al. .......... 705/3 |
| 2010/0063993 | A1* | 3/2010 | Higgins et al. .......... 709/203 |
| 2010/0114788 | A1 | 5/2010 | White et al. |
| 2010/0268830 | A1 | 10/2010 | McKee et al. |
| 2010/0281364 | A1* | 11/2010 | Sidman .......... 715/713 |
| 2010/0293247 | A1 | 11/2010 | McKee et al. |
| 2010/0305806 | A1* | 12/2010 | Hawley .......... 701/33 |
| 2011/0022602 | A1 | 1/2011 | Luo et al. |
| 2011/0179161 | A1 | 7/2011 | Guy et al. |
| 2011/0185020 | A1 | 7/2011 | Ramamurthy et al. |
| 2011/0252101 | A1* | 10/2011 | Davis et al. .......... 709/206 |

OTHER PUBLICATIONS

U.S. Appl. No. 12/653,117, Firminger et al.
U.S. Appl. No. 12/592,946, Firminger et al.
U.S. Appl. No. 12/592,944, Firminger et al.
U.S. Appl. No. 12/592,548, Firminger et al.
U.S. Appl. No. 12/592,544, Firminger et al.
U.S. Appl. No. 12/592,161, Firminger et al.
U.S. Appl. No. 12/592,075, Firminger et al.
U.S. Appl. No. 12/590,841, Firminger et al.
U.S. Appl. No. 12/590,600, Firminger et al.
U.S. Appl. No. 12/590,039, Firminger et al.
U.S. Appl. No. 12/590,027, Firminger et al.
U.S. Appl. No. 12/587,127, Firminger et al.
U.S. Appl. No. 12/587,018, Firminger et al.
U.S. Appl. No. 12/584,653, Firminger et al.
U.S. Appl. No. 12/584,489, Firminger et al.
Diaz, Jesus; "One Day, This Will Be Remembered as the First Real Tricorder"; gizmodo.com; bearing a date of Nov. 12, 2009; pp. 1-2; located at http://gizmodo.com/5403126/one-day-this-will-be-remembered-as-the...; printed on Nov. 25, 2009.
"Exercise Pro Software Active Care Version 5"; BioEX Systems, Inc.; bearing dates of 1995-2009; pp. 1-4; located at http://www.bioexsystems.com/ActiveCare.htm; printed on Dec. 17, 2009.
Gross, Daniel; "A Jewish Mother in Your Cell Phone"; Slate; bearing a date of Nov. 10, 2009; pp. 1-3; located at http://www.slate.com/formatdynamics/CleanPrintProxy.aspx?125919...; printed on Nov. 25, 2009.
Guez, Tomer; "Weight Loss Software, Food Diary, Exercise Tracker, and Medical Diary. 'The Food and Exercise Diary Software Version 6.0'"; bearing a date of Sep. 2009; pp. 1-17; located at http://www.weightlosssoftware.com/?ti=135&wn=2; printed on Dec. 17, 2009.
"Nutrition tracking software is critical for learning about foods and planning meals"; NutriCoach; bearing a date of Mar. 29, 2006; 6 total pgs.; located at http://www.nutricoach.net/diet_software.html; printed on Dec. 17, 2009.
"Nutritionmaker Focus Nutrition Software Motivate—Analyze—Instruct"; BioEX Systems, Inc.; bearing dates of 1995-2009; pp. 1-4; located at http://www.bioexsystems.com/NutritionMakerChiro.htm; printed on Dec. 17, 2009.
"Tired of a stiff neck and shoulders? Ergo Pro Computer Fatigue Software reminds you when to stretch and shows you how"; BioEX Systems, Inc.; bearing dates of 1995-2009; pp. 1-3; located at http://www.bioexsystems.com/ExerciseBreak.htm; printed on Dec. 17, 2009.
"VHI PC-Kits Desktop Edition"; Visual Health Information; pp. 1-2; located at http://www.vhikits.com/products/software/PCKitsDesktop.aspx; printed on Dec. 17, 2009.
Agger, Michael;"Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.
"Self-tracking links to get you started"; The Quantified Self: self knowledge through numbers; printed on Dec. 10, 2010; pp. 1-5; located at: http://quantifiedself.com/self-tracking-links-to-get-you-started/.
Chen, Jason; "You Can Soon Track Your Heart Rate with Your iPhone"; Gizmodo; Bearing a date of Oct. 9, 2009; p. 1; Creative Commons License; located at: http://gizmodo.com/5378340/you-can-soon-track-your-heart-rate-with-your-iphone; printed on Oct. 29, 2009.
"Fitbit"; Bearing a date of 2009; pp. 1-2; Fitbit, Inc.; located at: http://www.fitbit.com; printed on Oct. 29, 2009.
"FREE Exercise Programs—Workout Routines & Weight Loss Diet Plans"; Freetrainers.com; Bearing dates of 2000-2008; pp. 1-2; located at: http://www.freetrainers.com/FT/jsp/index.jsp; printed on Sep. 2, 2009.
Wilson, Mark; "Philips DirectLife Turns Exercise Into a Status Bar"; Gizmodo; Bearing a date of Oct. 21, 2009; pp. 1-2; Creative Commons License; located at: http://gizmodo.com/5386577/philips-directlife-turns-exercise-into-a-status-bar; printed on Oct. 29, 2009.
"Your Personalized Development Plan"; Central Michigan University; Bearing a date of 2004; p. 1; located at: http://www.chsbs.cmich.edu/leader_model/dplanintro.htm; printed on Sep. 2, 2009.
Gaonkar, Shravan, et al.; "Micro-Blog: Sharing and Querying Content Through Mobile Phones and Social Participation"; MobiSys '08; Jun. 17-20, 2008; pp. 174-186; ACM.

* cited by examiner

SOURCE USER BASED PROVISION OF ONE OR MORE TEMPLATES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/584,489, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 3 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/584,653, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 8 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,018, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,127, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,027, entitled PERSONALIZED PLAN DEVELOPMENT BASED ON ONE OR MORE REPORTED ASPECTS' ASSOCIATION WITH ONE OR MORE SOURCE USERS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,039, entitled PERSONALIZED PLAN DEVELOPMENT BASED ON ONE OR MORE REPORTED ASPECTS' ASSOCIATION WITH ONE OR MORE SOURCE USERS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,600, entitled PERSONALIZED PLAN DEVELOPMENT BASED ON IDENTIFICATION OF ONE OR MORE RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 10 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,841, entitled PERSONALIZED PLAN DEVELOPMENT BASED ON IDENTIFICATION OF ONE OR MORE RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 12 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,075, entitled DEVELOPMENT OF PERSONALIZED PLANS BASED ON ACQUISITION OF RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 17 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,161, entitled DEVELOPMENT OF PERSONALIZED PLANS BASED ON ACQUISITION OF RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 18 Nov. 2009, which is currently co-pending, or is an application of which a currently co-pending application is entitled to the benefit of the filing date.

For purposes of the USPTO extra-statutory requirements, the present application constitutes a continuation-in-part of United States Patent Application No. 12/592,544, entitled IDENTIFICATION AND PROVISION OF REPORTED ASPECTS THAT ARE RELEVANT WITH RESPECT TO ACHIEVEMENT OF TARGET OUTCOMES, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 24 Nov. 2009, which is currently co-pending, or is an application of which a currently co-pending application is entitled to the benefit of the filing date.

For purposes of the USPTO extra-statutory requirements, the present application constitutes a continuation-in-part of United States Patent Application No. 12/592,548, entitled IDENTIFICATION AND PROVISION OF REPORTED ASPECTS THAT ARE RELEVANT WITH RESPECT TO ACHIEVEMENT OF TARGET OUTCOMES, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 25 Nov. 2009, which is currently co-pending, or is an application of which a currently co-pending application is entitled to the benefit of the filing date.

For purposes of the USPTO extra-statutory requirements, the present application constitutes a continuation-in-part of United States Patent Application No. 12/592,944, entitled TEMPLATE DEVELOPMENT BASED ON SENSOR ORIGINATED REPORTED ASPECTS, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 3 Dec. 2009, which is currently co-pending, or is an application of which a currently co-pending application is entitled to the benefit of the filing date.

For purposes of the USPTO extra-statutory requirements, the present application constitutes a continuation-in-part of United States Patent Application No. 12/592,946, entitled TEMPLATE DEVELOPMENT BASED ON SENSOR ORIGINATED REPORTED ASPECTS, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 4 Dec. 2009, which is currently co-pending, or is an application of which a currently co-pending application is entitled to the benefit of the filing date.

For purposes of the USPTO extra-statutory requirements, the present application constitutes a continuation-in-part of United States Patent Application No. 12/653,117, entitled SOURCE USER BASED PROVISION OF ONE OR MORE TEMPLATES, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 7 December 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to receiving one or more requests for one or more particular templates that are associated with one or more source users, the one or more particular templates designed to facilitate one or more end users to achieve one or more target outcomes when one or more emulatable aspects included in the one or more particular templates are emulated; and providing from a plurality of templates the one or more particular templates, the providing being based at least on the association of the one or more particular templates with the one or more source users, the one or more particular templates developed based on one or more reported aspects associated with the one or more source users. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for receiving one or more requests for one or more particular templates that are associated with one or more source users, the one or more particular templates designed to facilitate one or more end users to achieve one or more target outcomes when one or more emulatable aspects included in the one or more particular templates are emulated; and means for providing from a plurality of templates the one or more particular templates, the providing being based at least on the association of the one or more particular templates with the one or more source users, the one or more particular templates developed based on one or more reported aspects associated with the one or more source users. In addition to the foregoing, other system aspects are described in the claims, drawings, and text forming a part of the present disclosure.

A computationally implemented system includes, but is not limited to: circuitry for receiving one or more requests for one or more particular templates that are associated with one or more source users, the one or more particular templates designed to facilitate one or more end users to achieve one or more target outcomes when one or more emulatable aspects included in the one or more particular templates are emulated; and circuitry for providing from a plurality of templates the one or more particular templates, the providing being based at least on the association of the one or more particular templates with the one or more source users, the one or more particular templates developed based on one or more reported aspects associated with the one or more source users. In addition to the foregoing, other system aspects are described in the claims, drawings, and text forming a part of the present disclosure.

A computer program product including a signal-bearing medium bearing one or more instructions for receiving one or more requests for one or more particular templates that are associated with one or more source users, the one or more particular templates designed to facilitate one or more end users to achieve one or more target outcomes when one or more emulatable aspects included in the one or more particular templates are emulated; and one or more instructions for providing from a plurality of templates the one or more particular templates, the providing being based at least on the association of the one or more particular templates with the one or more source users, the one or more particular templates developed based on one or more reported aspects associated with the one or more source users. In addition to the foregoing, other computer program product aspects are described in the claims, drawings, and text forming a part of the present disclosure.

A method for providing one or more templates that are associated with one or more source users from a plurality of templates, the method includes receiving one or more requests for one or more particular templates that are associated with one or more source users, the one or more particular templates designed to facilitate one or more end users to achieve one or more target outcomes when one or more emulatable aspects included in the one or more particular templates are emulated; and providing from a plurality of templates, using a processor, the one or more particular templates, the providing being based at least on the association of the one or more particular templates with the one or more source users, the one or more particular templates developed based on one or more reported aspects associated with the one or more source users.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
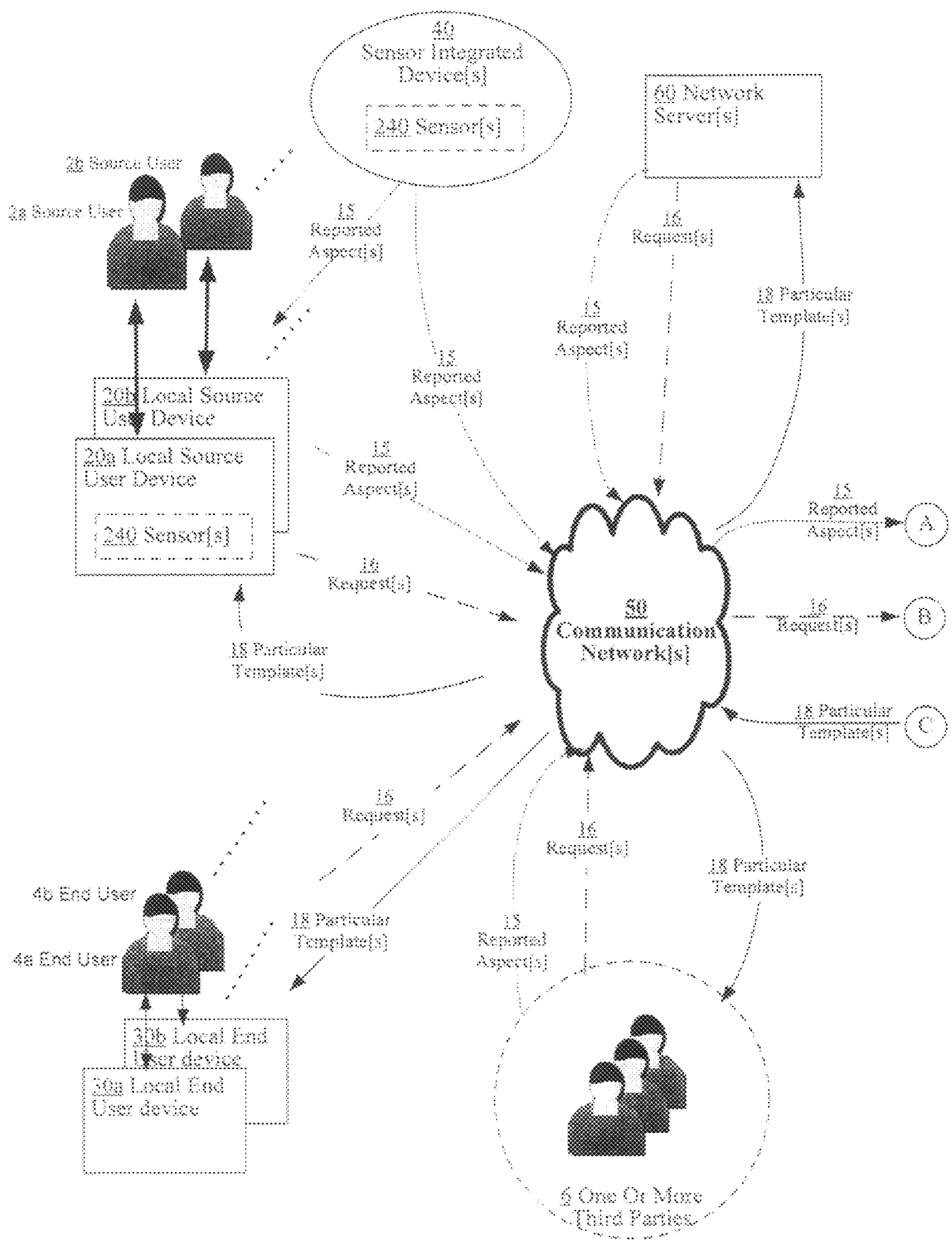
FIGS. 1a and 1b show a high-level block diagram of a Computing Device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that has enjoyed explosive popularity in the computing/communication field is to electronically record one's daily activities, behaviors, thoughts, beliefs, traits, physical or mental states, physical characteristics, and other aspects of the person's everyday life onto an open journal. One place where such open journals are maintained is at social networking sites commonly known as "blogs" where one or more users may report or post every aspect of their daily lives. In brief, an "aspect," as will be referred to herein, may be in reference to any act, behavior, characteristic, user state or status, belief, and so forth, that may be associated with a user (e.g., a person including, for example, a network user such as a blogger or a social networking user). The process of reporting or posting blog entries is commonly referred to as "blogging." A newer type of blogging that has become very popular in recent times is microblogging, otherwise known as "twittering" or "tweeting." In microblogging, each of the microblogs that are posted are typically relatively short posts or entries, usually not more than 140 characters long.

Other types of social networking sites may also allow users to maintain open journals and to allow users to easily update their personal information in real time. Such updates are typically made via, for example, social networking status reports otherwise known simply as "status reports." These social networking sites allow a user to report or post for others to view the latest status or other aspects related to the user.

Another recent tread in social networking is to employ one or more sensors to detect and report on a wide variety of user aspects (i.e., aspects of a user). Examples of sensors that may be used for such purposes vary widely, ranging from well-known devices that can detect and report on various physiological parameters such as heart rate or blood pressure, to sensors that can detect certain user behaviors or activities such as toilet usage. Examples of sensors that may be employed in order to monitor or detect user activities include, for example, accelerometers, pedometers, global positioning systems or GPSs, and so forth. Such devices are already, in fact, being integrated into mobile computing/communication devices such as cellular telephones and smart phones.

Other types of sensors are also being integrated into mobile computing/communication devices such as those that monitor environmental conditions. Examples of such sensors include, for example, those that can measure atmospheric conditions such as air quality levels. In some cases, sensors may be integrated into functional devices such as automobiles, exercise machines, household appliances, and so forth in order to detect and monitor their usage. There are also sensors that are currently available that can even monitor bathroom or toilet usage. All the above described sensors may be configured to provide their collected data through log entries such as entries made through social networking channels (e.g., microblogs).

Although a wealth of personal information provided through log entries (e.g., microblogs, status reports, and so forth) are now available through these social networking sites, it is only recently has there been any effort to exploit such potentially useful data. As blogs, microblogs, and various social networking sites become increasingly popular, personal data collected through such means may be spread across multiple network sites making it even more difficult to exploit such potentially useful data.

In various embodiments, methods, systems, circuitry, and computer program products are provided for selectively providing from a plurality of templates one or more particular or specific templates that are associated with one or more source users and that are designed to facilitate one or more end users to achieve one or more target outcomes when one or more emulatable aspects included in the one or more templates are emulated. In some embodiments, the one or more templates to be provided may have been originally developed based on log data associated with the one or more source users and provided through, for example, social networking channels (e.g., blogs, microblogs, and so forth). Note that the phrases "particular template" and "particular templates" will be used merely in reference to templates that are to be provided.

In some cases, the plurality of templates that the one or more particular templates are provided (e.g., acquired or identified) from may be stored in a memory and/or located at one or more network locations (e.g., servers, client devices, and so forth). In some embodiments, the methods, systems, circuitry, and computer program products may be implemented by a variety of computing/communication devices including, for example, a network device such as a server (e.g., network servers) or a local client device (e.g., a source user device or an end user device).

In various embodiments, the one or more templates that are provided by the methods, systems, circuitry, and computer program products may be presented to, for example, one or more end users to be used directly by the one or more end users in order to achieve the one or more target outcomes. Alternatively, the one or more provided templates may be further processed in order to generate one or more personalized templates (i.e., personalized plans) designed for use specifically by one or more particular end users. A "template" may be any type of plan, program, or schedule that is designed to facilitate achievement of one or more target outcomes when one or more emulatable aspects included in the template are emulated. The one or more emulatable aspects that may be included in the template may be based on and correspond to one or more reported aspects of one or more source users, who may or may not be the source for the one or more reported aspects. That is, a reported aspect may be reported by a number of different sources including, for example, by the source user (e.g., a microblogger or a social networking user) who is the basis for the reported aspect, by a sensor, or by a third party (e.g., such as another source user).

As briefly indicated above, a template may comprise of one or more emulatable aspects that may be based on reported aspects of a particular source user. Note that the word "emulatable" as used herein has no significant meaning, but instead is used here to merely distinguish those aspects (emulatable aspects) indicated in a template from other types of aspects (e.g., reported aspects). In accordance with various embodiments, a template may be developed for achieving almost any type of desired outcome (e.g., target outcome) so long as the appropriate data, such as log entry data of source users who have achieved the desired outcome, are available. Examples of the types of templates that could be developed based on log entry data include, for example, those that are designed to achieve medical or health related outcomes, to achieve athletic or gaming outcomes, to achieve particular user states such as mental or social states, to achieve intellectual or academic outcomes, and so forth.

In some cases, a template may indicate a collection of one or more activities (e.g., one or more emulatable aspects) or may indicate a more precise schedule of activities (e.g., emulatable aspects) that an end user may emulate in order to achieve a target outcome or outcomes. For example, if a template is designed to facilitate an end user to shed a certain amount of body weight, it may include a schedule of when and what activities (e.g., go jogging for 30 minutes on day 1, go swimming for 40 minutes on day 2, and so forth) the end user may need to execute in order to achieve the weight loss. Similarly, if the template is designed to, for example, facilitate an end user to achieve a high score for the scholastic aptitude test (SAT), the template may be a schedule of when and what activities (e.g., read a particular book on day 1, work on math problems from a particular math book on day 2, and so forth) the end user may need to execute in order to achieve the high test score for the SAT. Note that in some instances a template may include one or more emulatable intermediate outcomes that are associated with the one or more target outcomes associated with the template. For example, in the above weight loss example, the template may indicate the amount of weight loss an end user should have achieved (e.g., in order to achieve the target outcome) after emulating, for example, one week, two weeks, or a month of emulatable aspects indicated by the template.

In other cases, a template may merely be a collection of one or more emulatable aspects that does not define any relationships between the emulatable aspects. For example, a template designed to facilitate an end user to achieve relaxed state of mind may indicate two unlinked emulatable aspects, "get 8 hours of sleep each night," and "avoid caffeine beverages." Such a template would not necessarily have any indication of relationship between the two emulatable aspects indicated by the template.

In some embodiments, each template that may be developed may include or be linked to other information other than emulatable aspects. For example, in some instances, a template may include or be associated with a particular source user and/or with a particular target outcome. Other information may also be included with or be associated with a template as will be further described herein.

Since there is a large volume of personal data already potentially available for use in the form of log entry data (e.g., as provided through social networking channels), the amount of templates that could be developed based on such data could be enormous. Each template developed may at least be associated with a specific source user and/or with a specific target outcome. The templates may also be spread across, for example, multiple communication networks (e.g., wireless networks and/or wired networks) at multiple network sites. Thus, trying to find a particular template associated with, for example, a particular source user and/or a particular target outcome could become a daunting and cumbersome task. Thus, in some embodiments, dynamic methods, systems, circuitry, and computer program products are provided that facilitate in the finding and/or providing of one or more selective templates from a plurality of templates that may be associated with multiple source users and/or multiple target outcomes.

In order to facilitate understanding of the various concepts to be described herein, an introduction to the meaning of certain words and phrases to be used in the following discussion will now be provided. In brief, and as will be further described herein, an "aspect" may be any occurrence of any behavior, act, belief, characteristic, state, or any other facet associated with a source user or a group of source users. A "source user" may be any person, such as a microblogger, who may be the basis for one or more reported aspects. Note that a source user may not necessarily have to be the source for the one or more reported aspects that are related to the source user since reported aspects that are associated with a particular source user may be provided by other source users or by sensors.

A "reported aspect" may be any aspect associated with or related to a source user that has been reported by, for example, the source user, by one or more sensors, or by one or more third parties (e.g., other source users). In some instances, such a reported aspect may be reported in the form of a log entry such as a microblog entry, a status report, or a journal entry.

A "target outcome" may be any type of desirable goal or result that may be sought by, for example, an end user. Examples of target outcomes include, for example, health-related outcomes such as weight loss or improved cardiovascular conditioning, athletic outcomes such as developing a particular athletic skill including being able to pitch a curve ball or achieving a particular golf handicap, physiological outcomes such as reduced blood pressure or blood glucose levels, social outcomes such as obtaining membership into an elite social club or attaining a particular social status, mental state outcomes such as achieving certain level of calmness or happiness, interpersonal or relational outcomes such as having lots of friends or developing skill to make friends, employment outcomes such as being promoted or developing certain work skills, academic or intellectual outcomes, and so forth.

An "end user" may be any person who is a direct or indirect beneficiary of one or more templates. As briefly described above, a "source user" may be any person who may be the basis for one or more reported aspects. Note that although in most cases, a source user will be an actual (real) person who may be the basis for one or more reported aspects, in other cases, however, a source user may be a fictional person such as a composite of multiple "actual" source users. For example, reported aspects indicating actual aspects of a plurality of actual source users may be compiled and processed (e.g., normalized or averaged out) in order to create a fictional source user.

Figure 1B:
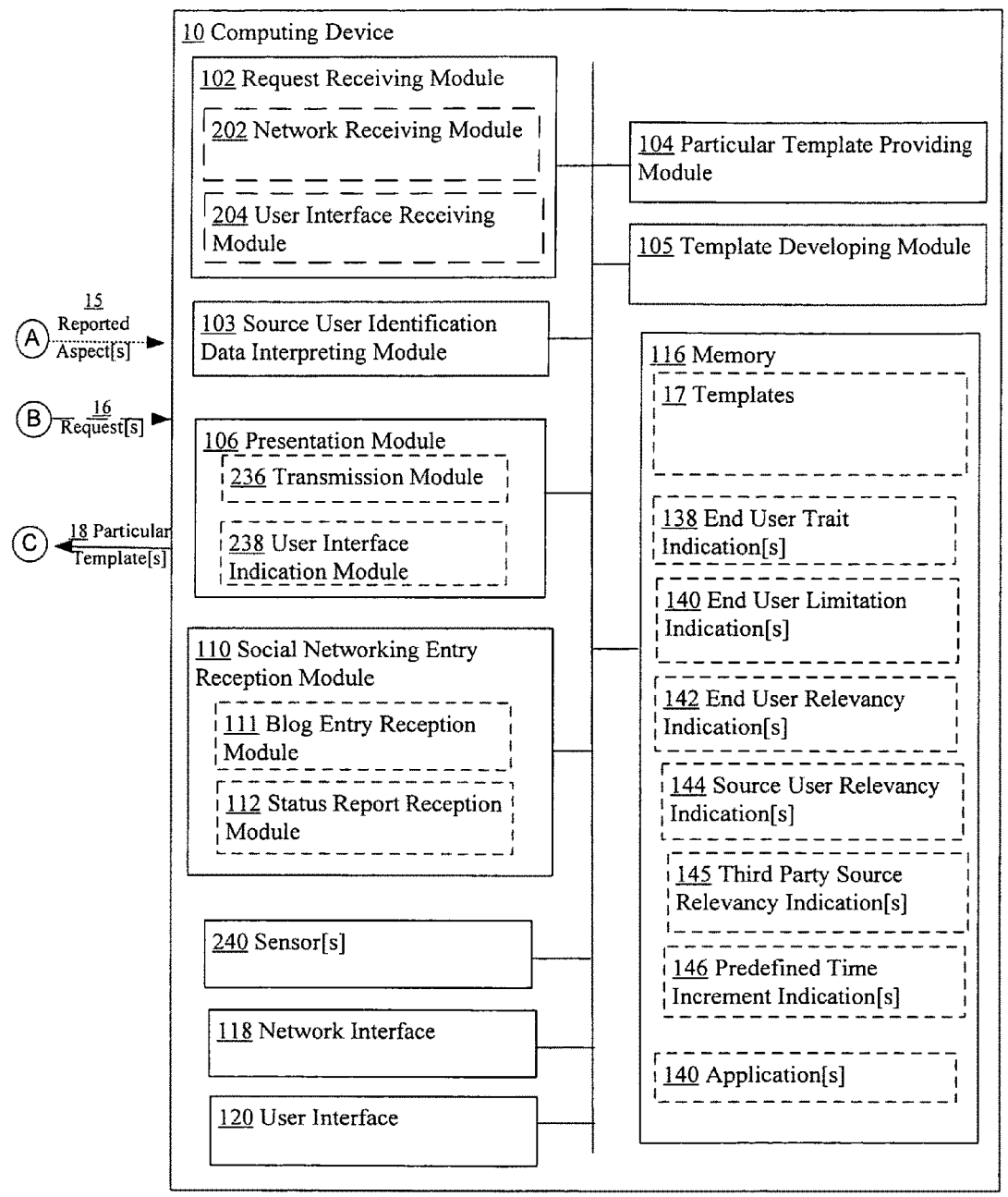

Turning now to FIGS. 1a, and 1b illustrating an example environment in which the methods, systems, circuitry, and computer program products in accordance with various embodiments may be implemented by a computing device 10. In particular, the methods, systems, circuitry, and computer program products may be implemented at any network device including at a peer-to-peer network component device. In some embodiments, the computing device 10 may be a server such as one of the one or more network servers 60 illustrated in FIG. 1a. Alternatively, the computing device 10 may be a source user device such as one of the local source user devices 20* illustrated in FIG. 1a. In still other embodiments, the computing device 10 may be an end user device such as one of the local end user device 30* illustrated in FIG. 1a. Note that in the following, "*" represents a wildcard. Thus, references in the following description to, for example, "a source user 2*" may be in reference to a source user 2a, a source user 2b, and so forth.

Note that for ease of understanding and explanation, the computing device 10 of the exemplary environment 100 of FIGS. 1a and 1b will be generally described in the following discussion operating as a server (e.g., server embodiment) rather than as an end user device or as a source user device. Further, although the following discussion related to the exemplary environment 100 of FIG. 1a and 1b assumes that the computing device 10 is a server, the following discussion will, for the most part, be applicable even if the computing device 10 is operating as an end user device (e.g., local end user device 30*) or as a source user device (e.g., local source user device 20*) with certain obvious exceptions (e.g., if the computing device 10 is an end user device or a source user device rather than a server, the computing device 10 may communicate with an end user 4* or a source user 2* directly through a user interface 120 rather than indirectly through one or more communication networks 50 as may be the case when the computing device 10 is a server). In some embodiments, the computing device 10 may operate via a web 1.0 or web 2.0 construct.

Referring back to FIGS. 1a and 1b, and as previously indicated, the computing device 10 may be a network device such as a server (e.g., a network server 60) that is designed to communicate with other network devices. For example, the computing device 10 may communicate with one or more source users 2*(e.g., source user 2a, source user 2b, and so forth) through one or more local source user devices 20*(e.g., local source user device 20a, local source user device 20b, and so forth), with one or more end users 4* (e.g., end user 4a, end user 4b, and so forth) through one or more local end user devices 30* (e.g., local end user device 30a, local end user device 30b, and so forth), with one or more sensor integrated devices 40 (e.g., a transportation vehicle such as a car, an exercise machine, or any other type of device that may have an integrated sensor designed to sense, for example, usage), with one or more network servers 60, and/or with one or more third parties 6 (e.g., one or more content providers, one or more network service providers, and/or one or more other parties) via one or more communication networks 50. In various implementations, the one or more communication networks 50 may include one or more wireless networks and/or one or more wired networks including, for example, at least one of a local area network (LAN), a wireless local area network (WLAN), personal area network (PAN), Worldwide Interoperability for Microwave Access (WiMAX), public switched telephone network (PTSN), general packet radio service (GPRS), cellular networks, and/or other types of wireless and/or wired networks.

Figure 2A:
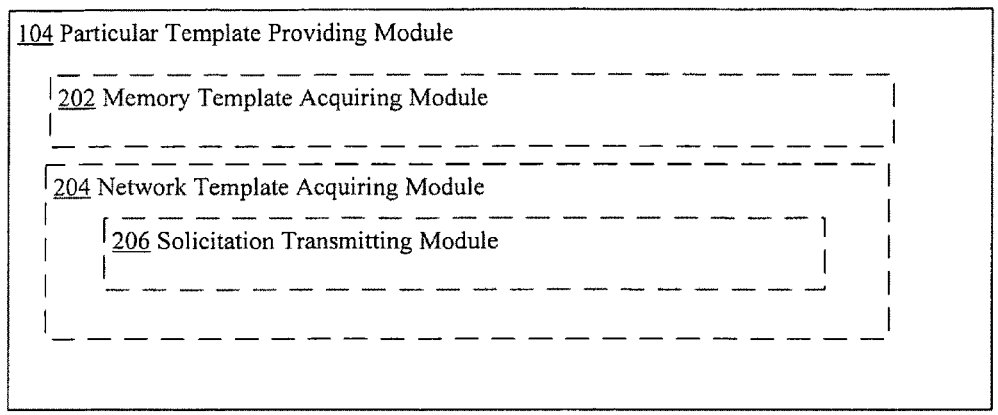
FIG. 2a shows another perspective of the Particular template providing module 104 of the Computing Device 10 of FIG. 1b.
Figure 2B:
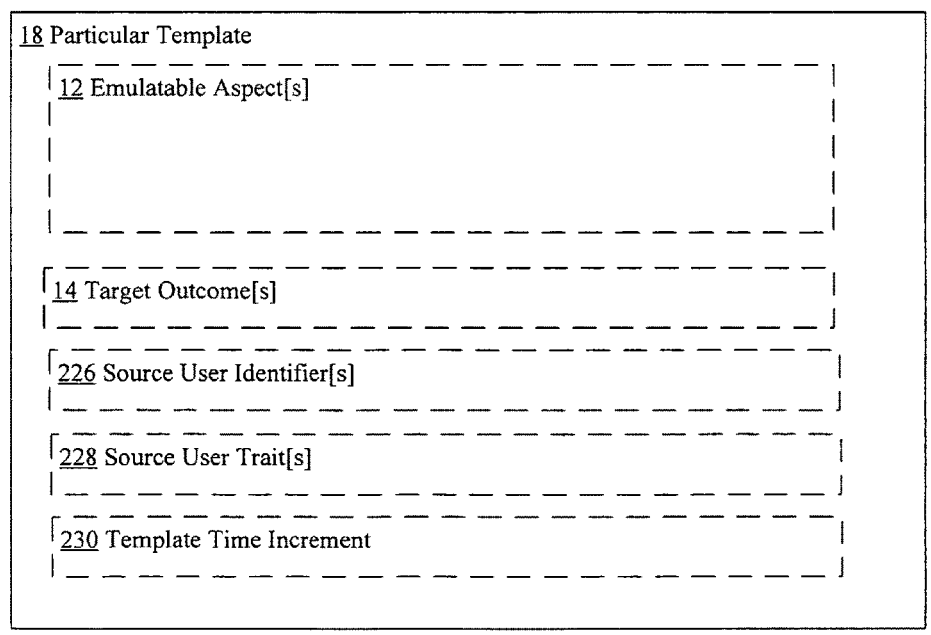
FIG. 2b shows one perspective of a Particular Template.

In various embodiments, the computing device 10 may be designed to, among other things, receive one or more requests 16 for one or more particular templates 18 that are associated with one or more source users 2\*, the one or more particular templates 18 designed to facilitate one or more end users 2\* to achieve one or more target outcomes 14 (see FIG. 2*b* illustrating one perspective of a template 17, which may also be a particular template 18) when one or more emulatable aspects 12 included in the one or more particular templates 18 are emulated. For these embodiments, the one or more requests 16 may be received from a variety of requesting sources including, for example, one or more end users 4\*, one or more third parties 6, and/or one or more network servers 60. In some embodiments, such as in embodiments in which the computing device 10 is a server, the one or more requests 16 may be indirectly received from a requesting source via the one or more communication networks 50. In other embodiments, such as in embodiments in which the computing device 10 is, for example, an end user device, the one or more requests 16 may be received directly from a requesting source (e.g., end user 4\*) via a user interface 120. In various embodiments, the one or more requests 16 may include data that may identify the one or more source users 2\* (e.g., one or more source users 2\* who may have achieved the one or more target outcomes 14. In some embodiments, the one or more requests 16 may include other data such as data that indicates the one or more target outcomes 14.

In response to receiving the one or more requests 16, the computing device 10 may be designed to selectively provide the requested one or more particular templates 18 from a plurality of templates 17, the providing of the one or more particular templates 18 being based at least on the association of the one or more particular templates 18 with the one or more source users 2\*, the one or more particular templates 18 developed (e.g., previously created) based on one or more reported aspects 15 associated with the one or more source users 2\*. In some embodiments, the computing device 10 may be designed to develop the plurality of templates 17 including the one or more particular templates 18 based on reported aspects 15 that may be acquired from one or more sources including, for example, one or more local source user devices 20\*, one or more sensor integrated devices 40, one or more third parties 6, and/or one or more network servers 60. In some embodiments, the computing device 10 may be designed to present the one or more templates 17 via user interface 120 and/or via one or more communication networks 50.

In some embodiments, the one or more particular templates 18 that are provided may be presented by, for example, transmitting the one or more particular templates 18 to one or more network servers 60, to one or more source users 2\*(e.g., one or more local source user devices 20\*), to one or more end users 4\*(e.g., one or more local end user devices 30\*), and/or to one or more third parties 6. In some embodiments where, for example, the computing device 10 is a source user device or an end user device, the computing device 10 may indicate (e.g., visually display or audioally indicate) the one or more particular templates 18 via a user interface 120.

In embodiments in which the computing device 10 is designed to receive reported aspects 15, the computing device 10 may randomly, semi-continuously, or continuously receive reported aspects 15 associated with one or more source users 2\*. Such reported aspects 15 may indicate a variety of aspects (e.g., behavior aspects such as user activities, user states, environmental conditions, and so forth) associated with the one or more source users 2\*.

In embodiments in which the computing device 10 is configured to develop, for example, one or more particular templates 18 that is designed to facilitate achievement of one or more target outcomes 14, the one or more particular templates 18 may be developed by, for example, determining which of the acquired reported aspects 15 may be relevant to achieving the one or more target outcomes 14, and include into the one or more particular templates 18 one or more emulatable aspects 12 that correspond (e.g., equivalent) to one or more reported aspects 15 that have been determined to be relevant to achieving the one or more target outcomes 14. Note that throughout the following discussion, reference number 18 will be used in connection with the one or more particular templates 18 that are requested and provided, while reference number 17 will be used with respect to the general population or group of templates 17 that the one or more particular templates 18 are provided from.

In various embodiments, the computing device 10, as previously indicated, may be a server (e.g., one of the one or more network servers 60) that may be located at a single network site, located across multiple network sites, or may be a conglomeration of servers located at multiple network sites. In embodiments in which the computing device 10 is a source user device (e.g., local source user device 20\*) or an end user device (e.g., local end user device 30\*) rather than a network server 60, the computing device 10 may be any one of a wide range of mobile or stationary computing/communication devices including, for example, a laptop, a desktop, a workstation, a cellular telephone, a personal digital assistant (PDA), a Smartphone, a web tablet such as a Netbook, and so forth.

Referring back to the exemplary environment 100 of FIGS. 1*a* and 1*b*, the one or more sensor integrated devices 40 of the exemplary environment 100 of FIGS. 1*a* and 1*b* may directly communicate with the one or more communication networks 50 in various embodiments. Alternatively, the one or more sensor integrated devices 40 may indirectly communicate with the one or more communication networks 50 via the one or more local source user devices 20\* (e.g., via, for example, personal area network or PAN). In various embodiments, a sensor integrated device 40 may be a variety of devices that may comprise of one or more sensors 240 and that may be operated or used by a source user 2\*. Examples of such devices include, for example, a transportation vehicle (e.g., automobile, a motorcycle, a boat, a plane, and so forth), an exercise machine (e.g., a treadmill), a household appliance (e.g., television set), and so forth.

As will be further described herein, the one or more sensors 240, which may also be included in the one or more local source user devices 20\* and/or the computing device 10, may include any type of sensors 240 that can sense one or more aspects of a source user 2\*. Examples of such sensors 240 include, for example, sensors 240 that can sense various physical characteristics of a source user 2\* (e.g., heart rate sensor or blood pressure sensor), sensors 240 that can sense activities of a source user 2\*(e.g., a pedometer, an accelerometer, and so forth), sensors 240 that can sense environment conditions (e.g., air quality sensors), sensors 240 that can sense the location of a source user 2\* (e.g., global positioning system or GPS), sensors 240 that can provide physiological data that may be processed in order to determined inferred mental states of users, and so forth.

Each of the one or more local source user devices 20\* and each of the one or more local end user devices 30\* (as well as the computing device 10 in embodiments in which the computing device 10 is an end user device or a source user device) may be any one of a variety of computing/communication devices including, for example, a cellular phone, a personal digital assistant (PDA), a laptop, a desktop, or other types of computing/communication devices. In some embodiments, the one or more local source user devices 20\* and/or the one or more local end user devices 30\* (as well as the computing device 10 in some embodiments) may be a handheld device such as a cellular telephone, a Smartphone, a Mobile Internet Device (MID), an Ultra Mobile Personal Computer (UMPC), a convergent device such as a personal digital assistant (PDA), and so forth. Alternatively, such local client devices (e.g., local source user device 20\* and/or local end user device 30\*) may be a laptop, a desktop, a workstation, a web tablet such as a Netbook, or other types of devices that may not be a handheld device in various alternative implementations.

The computing device 10 as illustrated in FIG. 1*b* may include one or more modules, sub-modules, and various other components. As shown, the computing device 10 may include at least a request receiving module 102 (which may further include a network receiving module 202 and/or a user interface receiving module 204) and a particular template providing module 104 (which may further include one or more sub-modules as illustrated in FIG. 2*a*). In various embodiments, the computing device 10 may further include a source user identification data interpreting module 103, a template developing module 105, a presentation module 106 (which may further include a transmission module 236 and/or a user interface indication module 238) and a memory 116 (which may store a plurality of templates 17, one or more end user trait indications 138, one or more end user limitation indications 140, one or more end user relevancy indications 142, one or more source user relevancy indications 144, one or more third party source relevancy indications 145, one or more predefined time increment indications 146, and/or one or more applications 140).

The computing device 10 may also include, in various embodiments, a network interface 118 (e.g., a network interface card or NIC), a user interface 120, a social networking entry reception module 110 (which may further include a blog entry reception module 111 and/or a status report reception module 112), and/or one or more sensors 240. In some cases, the presence or absence of some of these modules and sub-modules may depend on, for example, whether the computing device 10 is a server, an end user device, or a source user device. For example, if the computing device 10 is a server, then the computing device 10 may not include a user interface 120.

Referring particularly now to the request receiving module 102, the request receiving module 102 may be configured to, among other things, receive one or more requests 16 for one or more particular templates 18 that are associated with one or more source users 2\*, the one or more particular templates 18 designed to facilitate one or more end users 4\* to achieve one or more target outcomes 14 when one or more emulatable aspects 12 included in the one or more particular templates 18 are emulated. In contrast, the particular template providing module 104 may be configured to, among other things, provide from a plurality of templates 17 the one or more particular templates 18, the providing being based at least on the association of the one or more particular templates 18 with the one or more source users 2\*, the one or more particular templates 18 developed based on one or more reported aspects 15 related to the one or more source users 2\*.

The memory 116 may be designed to store various data including a plurality of templates 17, which may have been developed based on reported aspects 15 associated with one or more source users 2\*. Other types of data may also be stored in the memory 116 in various implementations including, for example, one or more end user trait indications 138 (e.g., one or more indications that indicate one or more traits of one or more end users 4\*), one or more end user limitation indications 140 (e.g., one or more indications that indicate limitations associated with one or more end users 4\* including contextual limitations, physical limitations, legal limitations, and so forth), one or more end user relevancy indications 142 (e.g., one or more indications that indicate the types of reported aspects 15 that an end user 4 has an interest in or believes is relevant to achieving one or more target outcomes 14) and/or one or more source user relevancy indications 144 (e.g., one or more indications provided by a source user 2\* that indicate at least which types of reported aspects 15 are relevant to achieving one or more target outcomes 14).

In some cases, the memory 116 may also include, for example, one or more third party source relevancy indications 145 (e.g., one or more indications provided by one or more third party sources such as one or more third parties 6 that indicate at least which types of reported aspects 15 are relevant to achieving one or more target outcomes 14), one or more predefined time increment indications 146 (e.g., one or more indications that indicate the lengths of time that may be allotted for executing one or more templates 17), and/or one or more applications 140 (e.g., a text messaging application, an instant messaging application, an email application, a social networking application, a voice recognition system, a Web 1.0 application, and/or Web 2.0 application to facilitate in communicating via, for example, the World Wide Web). In various implementations, the memory 116 may comprise of one or more of a mass storage device, a read-only memory (ROM), a programmable read-only memory (PROM), an erasable programmable read-only memory (EPROM), a cache memory such as random access memory (RAM), a flash memory, a synchronous random access memory (SRAM), a dynamic random access memory (DRAM), and/or other types of memory devices.

The source user identification data interpreting module 103 may be configured to process and interpret identification data that may be included in a request 16 received by the request receiving module 102. By interpreting the identification data (which, in some cases, may be in the form of RFID data, location data, image data, and so forth), one or more source users 2\* may be identified or determined.

In various implementations, the presentation module 106 may be configured to present one or more particular templates 18 provided by the particular template providing module 104. The transmission module 236 that may be included in the presentation module 106 may be designed to transmit the one or more particular templates 18 provided by the particular template providing module 104 via the one or more communication networks 50. The user interface indication module 238, in contrast, may be designed to indicate the one or more particular templates 18 via a user interface 120 (e.g., display monitor, speaker system, touch screen, and so forth).

The social networking entry reception module 110 may be configured to receive social networking entries from one or more sources including, for example, from one or more source users 2*, from one or more end users 4*, from one or more third parties 6, from one or more sensor integrated devices 40, and/or from one or more network servers 60. The social networking entry reception module 110 may further include a blog entry reception module 111 for receiving blog entries (e.g. microblog entries) and/or a status report reception module 112 for receiving social networking status reports. The user interface 120 may include one or more of, for example, a display monitor, a touchscreen, a keyboard, a keypad, a mouse, an audio system including one or more speakers, a microphone, an image capturing device such as a digital camera, and so forth.

FIG. 2a illustrates particular implementations of the particular template providing module 104 of the computing device 10 of FIG. 1b. As illustrated, the particular template providing module 104 may include, in various implementations, one or more sub-modules. For example, in some implementations, the particular template providing module 104 may include a memory template acquiring module 202 and/or a network template acquiring module 204 (which may further include a solicitation transmitting module 206). In brief, the memory template acquiring module 202 may be designed to acquire from the memory 116 the one or more particular templates 18 that are to be provided. In contrast, the network template acquiring module 204 may be designed to acquire from the one or more communication networks 50, the one or more particular templates 18 that are to be provided. In some cases, the network template acquiring module 204 may further include a solicitation transmitting module 206 configured to transmit one or more solicitations for the one or more particular templates 18.

FIG. 2b illustrates one perspective of a particular template 18 (or template 17). In particular, FIG. 2b shows the types of data that may be included in or be associated with a particular template 18. In various implementations, a particular template 18 (or template 17) may include data that indicates, for example, one or more emulatable aspects 12, one or more target outcomes 14 (which in some cases may be one or more of the emulatable aspects 12), one or more source user identifiers 226 (for identifying at least one source user 2* associated with the particular template 18), one or more source user traits 228 (indicates one or more traits of the source user 2* who is associated with the particular template 18), and/or a template time increment 230 (represents the amount of time it will take to fully emulate or execute the particular template 18). Note that FIG. 2b is provided for purposes of merely showing the types of data that may be included in or associated with a particular template 18 (or template 17) and is not meant to be an actual representation of a particular template 18 (or template 17).

In embodiments in which the particular template 18 includes data that indicate multiple emulatable aspects 12, the particular template 18 may also include data that defines the relationship (e.g., temporal, specific time, and/or spatial relationships) between the emulatable aspects. Also, when the particular templates 18 indicates multiple emulatable one or more of the emulatable aspects 12 may be one or more emulatable intermediate outcomes that are associated with the one or more target outcomes 14 of the particular template 18. For example, if a target outcome for a particular template 18 is to lose 20 pounds of body weight in two months, than an emulatable intermediate outcome may be, for example, 10 pounds of body weight loss after one month of emulating the particular template 18.

Referring back to the computing device 10 of FIG. 1b, the various modules (e.g., the request receiving module 102, the particular template providing module 104, and so forth) along with their sub-modules included in the computing device 10 may be implemented using hardware, software, firmware, or any combination thereof. For example, in some implementations, the request receiving module 102 and/or the particular template providing module 104 may be implemented with a processor 802 (e.g., microprocessor, controller, and so forth) executing computer readable instructions 804 (e.g., computer program product) stored in a storage medium 806 (e.g., volatile or non-volatile memory) such as a signal-bearing medium as depicted in the computing device 10 of FIG. 8. Alternatively, hardware such as application specific integrated circuit (ASIC) may be employed in order to implement such modules in some alternative implementations.

Figure 3:
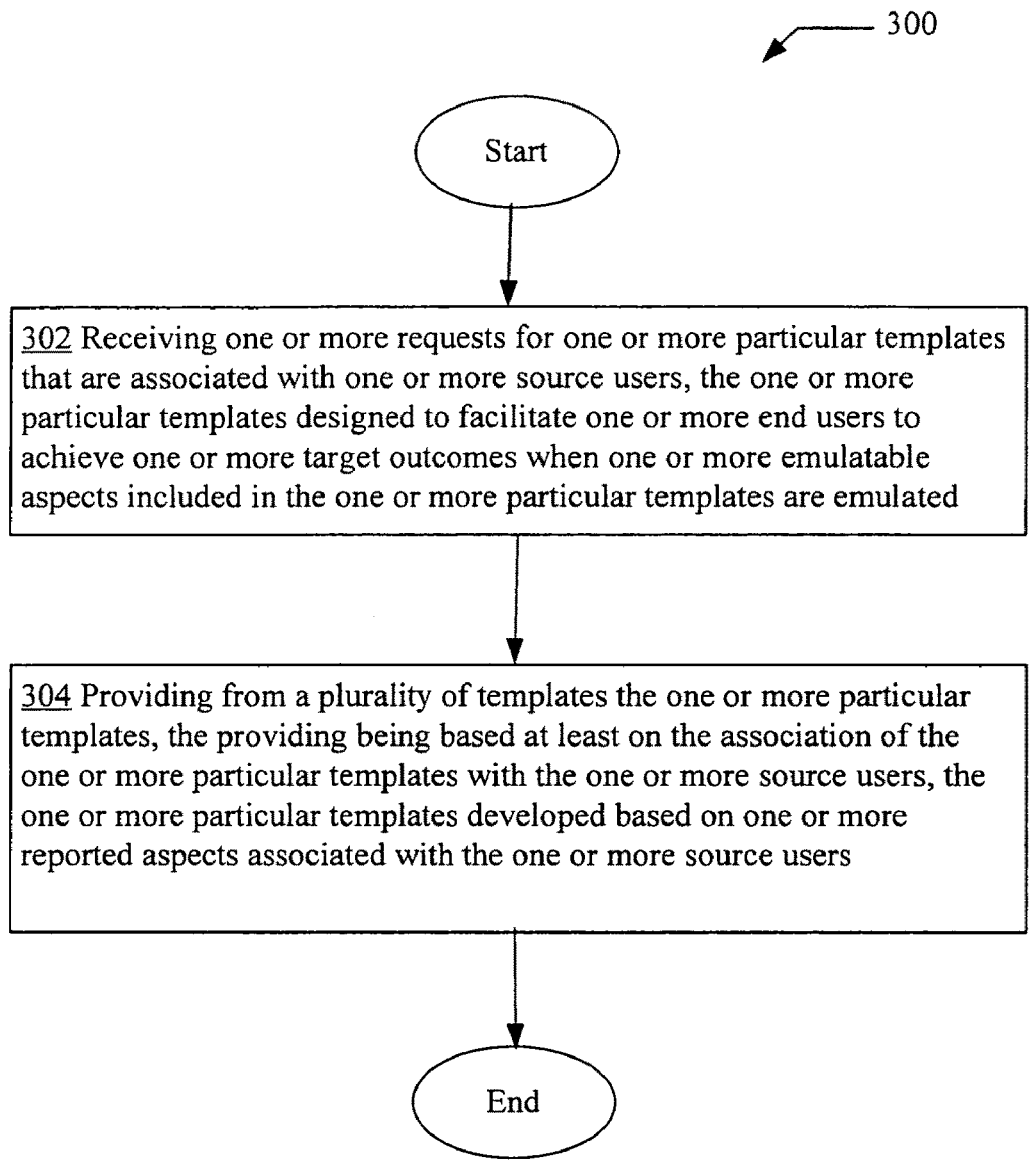
FIG. 3 is a high-level logic flowchart of a process.

A more detailed discussion relating to the functional aspects of the computing device 10 of FIG. 1b and its components will now be provided with respect to the processes and operations to be described herein. FIG. 3 illustrates an operational flow 300 representing example operations directed to, among other things, provide from a plurality of templates 17 one or more particular templates 18 that are associated with one or more source users 2* and that are designed to facilitate one or more end users 4* to achieve one or more target outcomes 14 when one or more emulatable aspects 12 included in the one or more particular templates 18 are emulated, the providing of the one or more particular templates 18 being based, at least in part, on their association with the one or more source users 2*.

In FIG. 3 and in the following figures that include various examples of operational flows, discussions and explanations of the operational flows will be provided with respect to the exemplary environment 100 described above as illustrated in FIGS. 1a and 1b, and/or with respect to other examples (e.g., as provided in FIGS. 2a and 2b) and contexts. However, it should be understood that the operational flows may be executed in a number of other environments and contexts, and/or in modified versions of FIGS. 1a, 1b, 2a, and 2b. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 300 may move to a request receiving operation 302 for receiving one or more requests for one or more particular templates that are associated with one or more source users, the one or more particular templates designed to facilitate one or more end users to achieve one or more target outcomes when one or more emulatable aspects included in the one or more particular templates are emulated. For instance, and as an illustration, the request receiving module 102 of the computing device 10 of FIG. 1b receiving (e.g., from one or more communication networks 50 and/or via a user interface 120) one or more requests 16 (e.g., solicitations, queries, and so forth) for one or more particular templates 18 that are associated with one or more source users 2*, the one or more particular templates 18 designed to facilitate one or more end users 4* to achieve one or more target outcomes 14 when one or more emulatable aspects 12 included in the one or more particular templates 18 are emulated. In various implementations, the one or more source users 2* who are associated with the one or more particular templates 18 may have previously achieved the one or more target outcomes 14 and may be the source for the data (e.g., reported aspects 15) used to develop the one or more particular templates 18.

In addition to the request reception operation 302, operational flow 300 may also include a template providing operation 304 for providing from a plurality of templates the one or more particular templates, the providing being based at least on the association of the one or more particular templates with the one or more source users, the one or more particular templates developed based on one or more reported aspects associated with the one or more source users. For instance, the particular template providing module 104 of the computing device 10 providing from a plurality of templates 17 the one or more particular templates 18, the providing of the one or more particular templates 18 being based at least on the association of the one or more particular templates 18 with the one or more source users 2*, the one or more particular templates 18 developed based on one or more reported aspects 15 associated with the one or more source users 2*. As will be further described herein, both the request receiving operation 302 and the template providing operation 304 of FIG. 3 may be executed in a number of different ways in various alternative implementations.

Figure 4A:
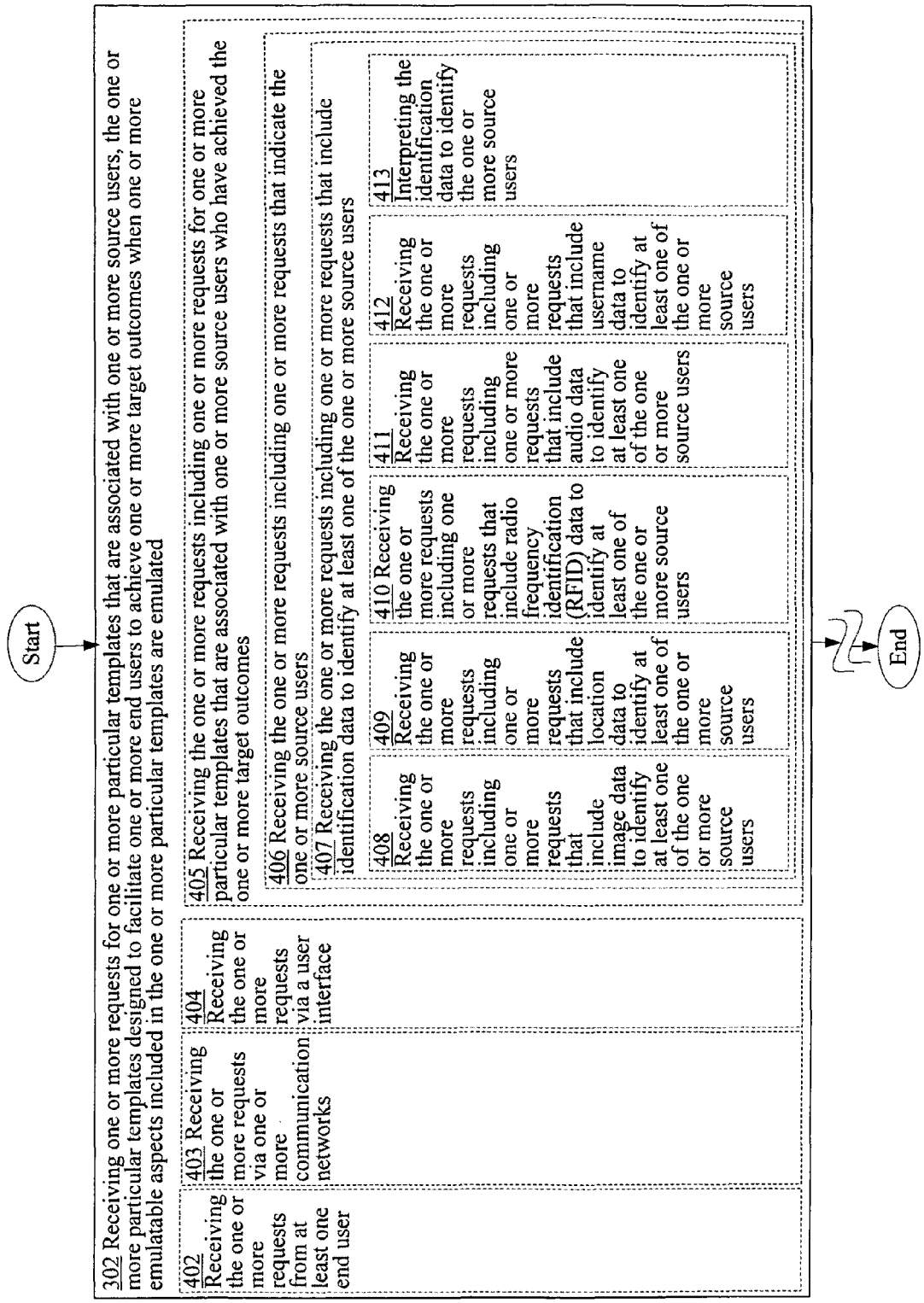
FIG. 4a is a high-level logic flowchart of a process depicting alternate implementations of the request receiving operation 302 of FIG. 3.
Figure 4B:
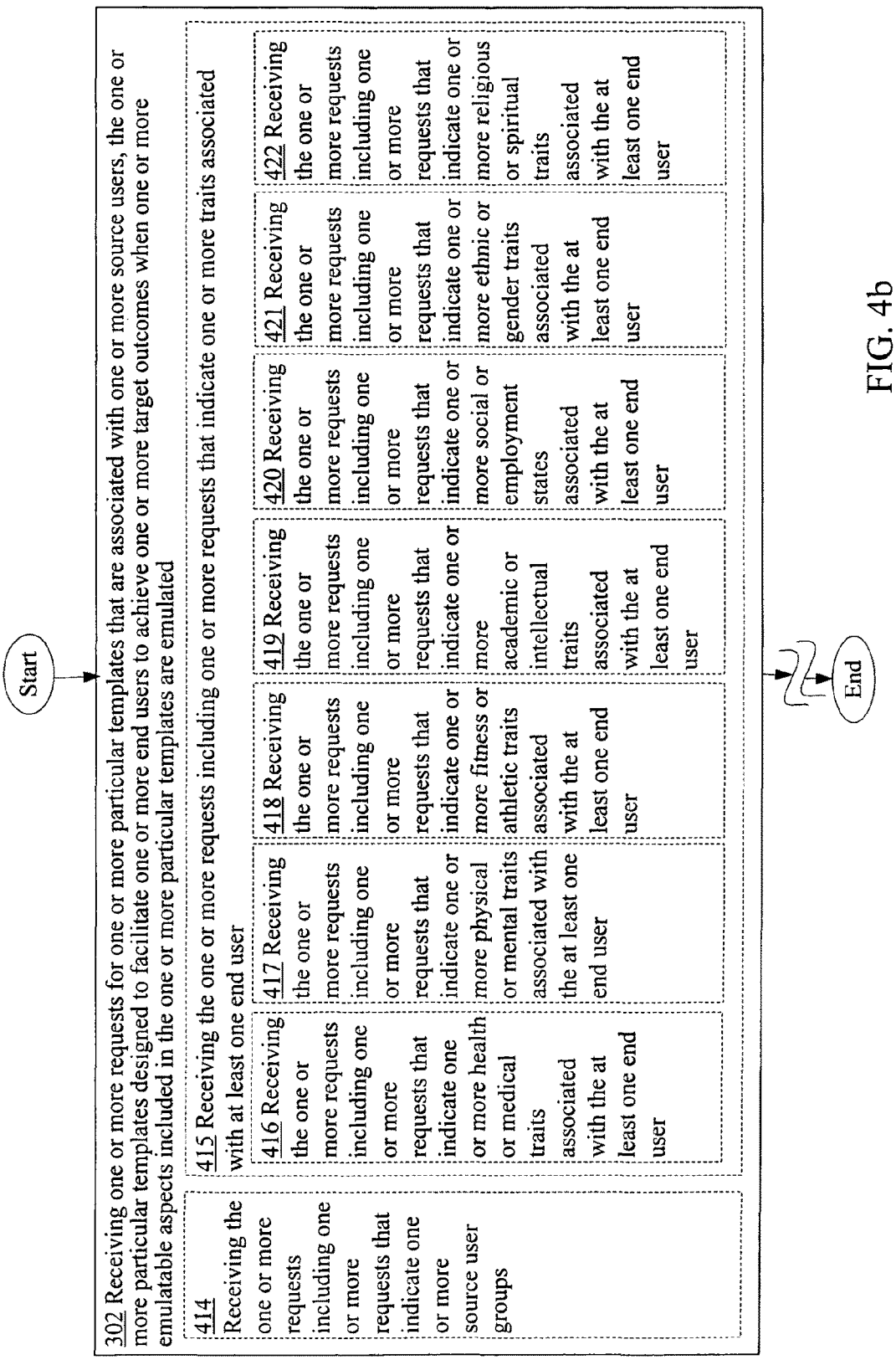
FIG. 4b is a high-level logic flowchart of a process depicting alternate implementations of the request receiving operation 302 of FIG. 3.
Figure 4C:
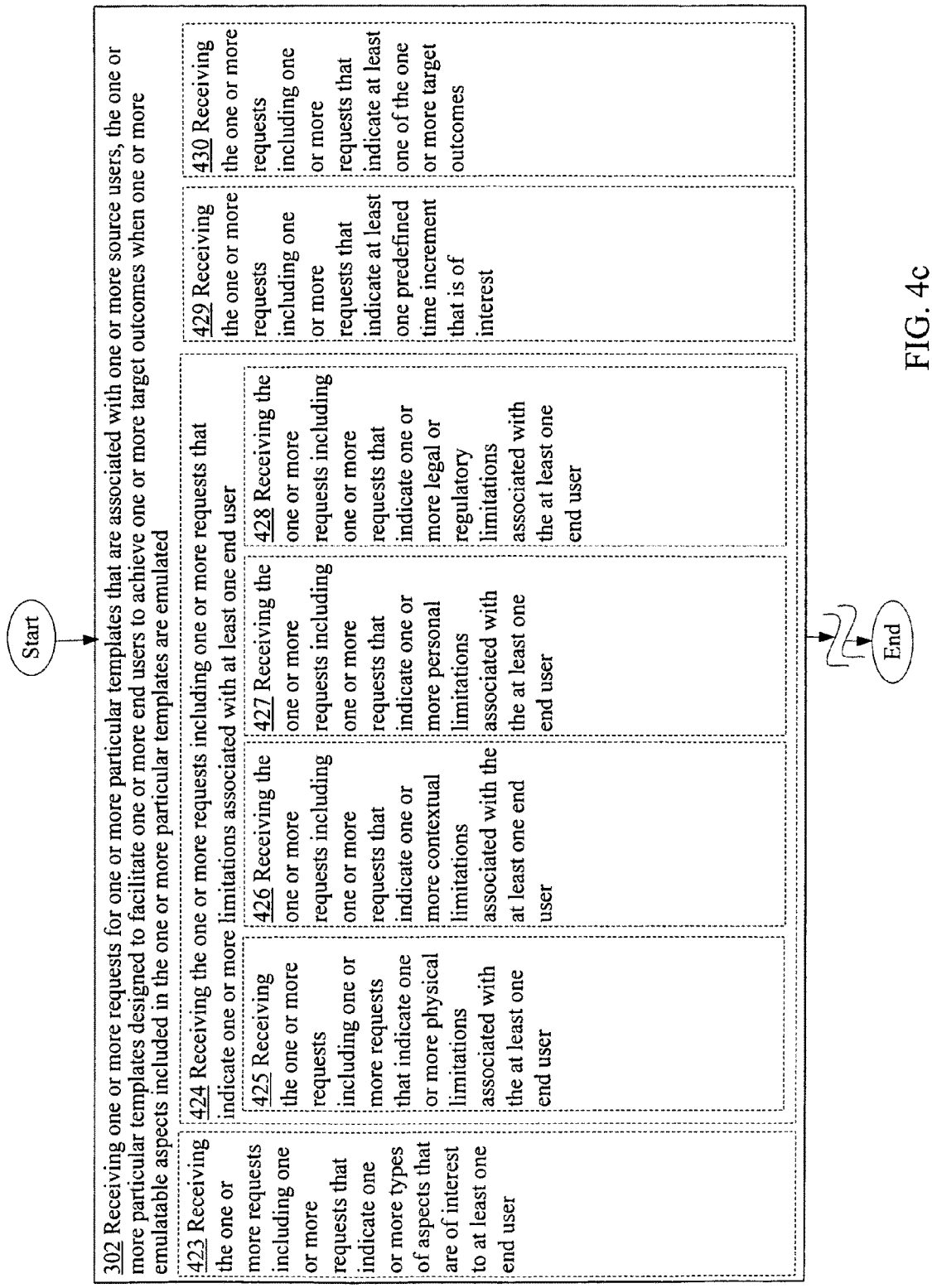
FIG. 4c is a high-level logic flowchart of a process depicting alternate implementations of the request receiving operation 302 of FIG. 3.

For example, FIGS. 4a, 4b, and 4c illustrate the various ways that the request reception operation 302 of FIG. 3 may be executed in various alternative implementations. For instance, the one or more requests 16 received through the request receiving operation 302 may be received from a variety of sources in a variety of different ways. For example, in some implementations, the request receiving operation 302 of FIG. 3 may include an operation 402 for receiving the one or more requests from at least one end user as depicted in FIG. 4a. For instance, the request receiving module 102 of the computing device 10 of FIG. 1b receiving (e.g., via one or more communication networks 50 or via user interface 120) the one or more requests 16 from an end user 4*. Alternatively, the one or more requests 16 may be received from other sources such as from one or more third parties (e.g., network service providers) or from one or more network servers 60.

In the same or different implementations, the request receiving operation 302 may include an operation 403 for receiving the one or more requests via one or more communication networks as depicted in FIG. 4a. For instance, the network receiving module 202 of the computing device 10 receiving the one or more requests 16 via one or more communication networks 50 (e.g., a wireless network and/or a wired network).

In some implementations, the request receiving operation 302 may include an operation 404 for receiving the one or more requests via a user interface as depicted in FIG. 4a. For instance, the user interface receiving module 204 of the computing device 10 receiving the one or more requests 16 via a user interface 120.

In some implementations, the request reception operation 302 may include an operation 405 for receiving the one or more requests including one or more requests for one or more particular templates that are associated with one or more source users who have achieved the one or more target outcomes as depicted in FIG. 4a. For instance, the request receiving module 102 of the computing device 10 receiving the one or more requests 16 including one or more requests 16 for one or more particular templates 18 that are associated with one or more source users 2* who have achieved the one or more target outcomes 14.

Various types of information may be included in the one or more requests 16 to be received through the request receiving operation 302 of FIG. 3. For example, in some implementations, the request receiving operation 302 may include an operation 406 for receiving the one or more requests including one or more requests that indicate the one or more source users as depicted in FIG. 4a. For instance, the request receiving module 102 of the computing device 10 receiving the one or more requests 16 including one or more requests 16 that indicate the one or more source users 2*. For example, in some cases the one or more requests 16 may include identification data that may facilitate in identifying the one or more source users 2*.

For example, in some implementations, operation 406 may include an operation 407 for receiving the one or more requests including one or more requests that include identification data to identify at least one of the one or more source users as depicted in FIG. 4a. For instance, the request receiving module 102 of the computing device 10 receiving the one or more requests 16 including one or more requests 16 that include identification data to identify at least one of the one or more source users 2*. Various types of data may be included in the one or more requests 16 in order to facilitate in the identification of at least one of the one or more source users 2* in various alternative implementations.

For example, in some implementations, operation 407 may include an operation 408 for receiving the one or more requests including one or more requests that include image data to identify at least one of the one or more source users as depicted in FIG. 4a. For instance, the request receiving module 102 of the computing device 10 receiving the one or more requests 16 including one or more requests 16 that include image data (e.g., as recorded by a digital camera or camcorder) to identify at least one of the one or more source users 2*.

In the same or different implementations, the operation 407 may include an operation 409 for receiving the one or more requests including one or more requests that include location data to identify at least one of the one or more source users as depicted in FIG. 4a. For instance, the request receiving module 102 of the computing device 10 receiving the one or more requests 16 including one or more requests 16 that include location data (e.g., geographical location data as provided by a GPS device) to identify at least one of the one or more source users 2*. Note that since multiple source users 2* may be at or near the same geographical location at any given moment in time, additional data may be needed in order to identify at least one of the one or more source users 2*.

In the same or different implementations, the operation 407 may include an operation 410 for receiving the one or more requests including one or more requests that include radio frequency identification (RFID) data to identify at least one of the one or more source users as depicted in FIG. 4a. For instance, the request receiving module 102 of the computing device 10 receiving the one or more requests 16 including one or more requests 16 that include radio frequency identification (RFID) data to identify at least one of the one or more source users 2*. For example, in some implementations, source users 2* may choose to wear RFID tags in order to be identified without having to provide personal information such as their actual name or having their privacy intruded upon.

In the same or different implementations, the operation 407 may include an operation 411 for receiving the one or more requests including one or more requests that include audio data to identify at least one of the one or more source users as depicted in FIG. 4a. For instance, the request receiving module 102 of the computing device 10 receiving the one or more requests 16 including one or more requests 16 that include audio data (e.g., voice data) to identify at least one of the one or more source users 2*.

In the same or different implementations, the operation 407 may include an operation 412 for receiving the one or more requests including one or more requests that include username data to identify at least one of the one or more source users as depicted in FIG. 4a. For instance, the request receiving module 102 of the computing device 10 receiving the one or more requests 16 including one or more requests 16 that include username data (e.g., indicating one or more social networking usernames or an actual name) to identify at least one of the one or more source users 2*.

In order to identify the one or more source users 2*, identification data that in some cases may be included in the one or more requests 16 may be processed and interpreted. For example, in some implementations operation 407 may include an operation 413 for interpreting the identification data to identify the one or more source users as depicted in FIG. 4a. For instance, the source user identification data interpretation module 103 of the computing device 10 interpreting the identification data to identify the one or more source users 2*.

In some implementations, the request receiving operation 302 may include an operation 414 for receiving the one or more requests including one or more requests that indicate one or more source user groups as depicted in FIG. 4b. For instance, the request receiving module 102 of the computing device 10 receiving the one or more requests 16 including one or more requests 16 that indicate one or more source user groups (e.g., social networking groups, academic groups, employment groups, business groups, athletic groups, and so forth).

In order to facilitate in selectively providing the one or more particular templates 18, the one or more requests 16 received through the request receiving operation 302 of FIG. 3 may include other information other than source user identification data. For example, in some implementations, the request receiving operation 302 may include an operation 415 for receiving the one or more requests including one or more requests that indicate one or more traits associated with at least one end user as depicted in FIG. 4b. For instance, the request receiving module 102 of the computing device 10 receiving the one or more requests 16 including one or more requests 16 that indicate one or more traits associated with at least one end user 4*. By including such information into the one or more requests 16, only templates 17 that are associated with source users 2* who have, for example, common traits with the at least one end user 4* may be provided.

Various types of user traits may be indicated by the one or more requests 16 that are received through operation 415 in various alternative implementations. For example, in some implementations, operation 415 may include an operation 416 for receiving the one or more requests including one or more requests that indicate one or more health or medical traits associated with the at least one end user as depicted in FIG. 4b. For instance, the request receiving module 102 of the computing device 10 receiving the one or more requests 16 including one or more requests 16 that indicate one or more health or medical traits (e.g., a particular illness or affliction such as stomach cancer or participating in a particular medical treatment such as chemotherapy) associated with the at least one end user 4*.

In the same or different implementations, operation 415 may include an operation 417 for receiving the one or more requests including one or more requests that indicate one or more physical or mental traits associated with the at least one end user as depicted in FIG. 4b. For instance, the request receiving module 102 of the computing device 10 receiving the one or more requests 16 including one or more requests 16 that indicate one or more physical or mental traits (e.g., being overweight, being short, having high blood pressure, inflicted with a particular phobia, being angry, and so forth) associated with the at least one end user 4*.

In the same or different implementations, operation 415 may include an operation 418 for receiving the one or more requests including one or more requests that indicate one or more fitness or athletic traits associated with the at least one end user as depicted in FIG. 4b. For instance, the request receiving module 102 of the computing device 10 receiving the one or more requests 16 including one or more requests 16 that indicate one or more fitness or athletic traits (e.g., being able to run a marathon under 3 hours) associated with the at least one end user 4*.

In the same or different implementations, operation 415 may include an operation 419 for receiving the one or more requests including one or more requests that indicate one or more academic or intellectual traits associated with the at least one end user as depicted in FIG. 4b. For instance, the request receiving module 102 of the computing device 10 receiving the one or more requests 16 including one or more requests 16 that indicate one or more academic or intellectual traits (e.g., having previously failed a particular exam or having an IQ under 120) associated with the at least one end user 4*.

In the same or different implementations, operation 415 may include an operation 420 for receiving the one or more requests including one or more requests that indicate one or more social or employment states associated with the at least one end user as depicted in FIG. 4b. For instance, the request receiving module 102 of the computing device 10 receiving the one or more requests 16 including one or more requests 16 that indicate one or more social or employment states (e.g., being unmarried or unemployed) associated with the at least one end user 4*.

In the same or different implementations, operation 415 may include an operation 421 for receiving the one or more requests including one or more requests that indicate one or more ethnic or gender traits associated with the at least one end user as depicted in FIG. 4b. For instance, the request receiving module 102 of the computing device 10 receiving the one or more requests 16 including one or more requests 16 that indicate one or more ethnic or gender traits (e.g., being Asian, being a female, and so forth) associated with the at least one end user 4*.

In the same or different implementations, operation 415 may include an operation 422 for receiving the one or more requests including one or more requests that indicate one or more religious or spiritual traits associated with the at least one end user as depicted in FIG. 4b. For instance, the request receiving module 102 of the computing device 10 receiving the one or more requests 16 including one or more requests 16 that indicate one or more religious or spiritual traits (e.g., being a Hindu or Scientologist) associated with the at least one end user 4*.

In some cases, the one or more requests 16 received through the request receiving operation 302 of FIG. 3 may indicate the types of emulatable aspects 12 that at least one of the end users 4* may have an interest in. By providing such information, only templates 17 that are associated with the one or more source users 2\* and that include emulatable aspects 12 that are of interest to the at least one of the end users 4\* may be provided. For example, in some implementations, the request receiving operation 302 of FIG. 3 may include an operation 423 for receiving the one or more requests including one or more requests that indicate one or more types of aspects that are of interest to at least one end user as depicted in FIG. 4c. For instance, the request receiving module 102 of the computing device 10 receiving the one or more requests 16 including one or more requests 16 that indicate one or more types of aspects (e.g., dietary activities or mental states) that are of interest to at least one end user 4\*.

In some cases, the one or more requests 16 received through the request receiving operation 302 of FIG. 3 may include information that indicate certain limitations associated with one or more end users 4\*. Such information may be used in order to prevent from being provided those templates 17 that include emulatable aspects 12 that may conflict with the limitations associated with the one or more end users 4\*. For example, various implementations, the request receiving operation 302 of FIG. 3 may include an operation 424 for receiving the one or more requests including one or more requests that indicate one or more limitations associated with at least one end user as depicted in FIG. 4c. For instance, the request receiving module 102 of the computing device 10 receiving the one or more requests 16 including one or more requests 16 that indicate one or more limitations (e.g., being a vegan) associated with at least one end user 4\*.

Various types of end user limitations may be indicated by the one or more requests 16. For example, in some implementations, operation 424 may include an operation 425 for receiving the one or more requests including one or more requests that indicate one or more physical limitations associated with the at least one end user as depicted in FIG. 4c. For instance, the request receiving module 102 of the computing device 10 receiving the one or more requests 16 including one or more requests 16 that indicate one or more physical limitations (e.g., has poor eyesight or hearing, or unable to walk) associated with the at least one end user 4\*.

In some implementations, operation 424 may include an operation 426 for receiving the one or more requests including one or more requests that indicate one or more contextual limitations associated with the at least one end user as depicted in FIG. 4c. For instance, the request receiving module 102 of the computing device 10 receiving the one or more requests 16 including one or more requests 16 that indicate one or more contextual limitations (e.g., logistical limitations such as no access to a swimming pool) associated with the at least one end user 4\*.

In some implementations, operation 424 may include an operation 427 for receiving the one or more requests including one or more requests that indicate one or more personal limitations associated with the at least one end user as depicted in FIG. 4c. For instance, the request receiving module 102 of the computing device 10 receiving the one or more requests 16 including one or more requests 16 that indicate one or more personal limitations (e.g., won't participate in activities with in-laws) associated with the at least one end user 4\*.

In some implementations, operation 424 may include an operation 428 for receiving the one or more requests including one or more requests that indicate one or more legal or regulatory limitations associated with the at least one end user as depicted in FIG. 4c. For instance, the request receiving module 102 of the computing device 10 receiving the one or more requests 16 including one or more requests 16 that indicate the one or more requests 16 including one or more requests 16 that indicate one or more legal or regulatory limitations (e.g., cannot use certain medications or cannot chew gum) associated with the at least one end user 4\*.

In some implementations, the request receiving operation 302 of FIG. 3 may include an operation 429 for receiving the one or more requests including one or more requests that indicate at least one predefined time increment that is of interest as depicted in FIG. 4c. For instance, the request receiving module 102 of the computing device 10 receiving the one or more requests 16 including one or more requests 16 that indicate at least one predefined time increment that is of interest to, for example, an end user 4\* or a third party 6. Such information may be used in order to exclude, for example, templates 17 that takes more time to execute than the predefined time increment indicated by the one or more requests 16. For example, if an end user wishes to lose 20 pounds in a month, templates 17 for losing 20 pounds that takes more than one month to execute may be excluded from being provided.

In some implementations, the request receiving operation 302 of FIG. 3 may include an operation 430 for receiving the one or more requests including one or more requests that indicate at least one of the one or more target outcomes as depicted in FIG. 4c. For instance, the request receiving module 102 of the computing device 10 receiving the one or more requests 16 including one or more requests 16 that indicate at least one of the one or more target outcomes 14.

Figure 5A:
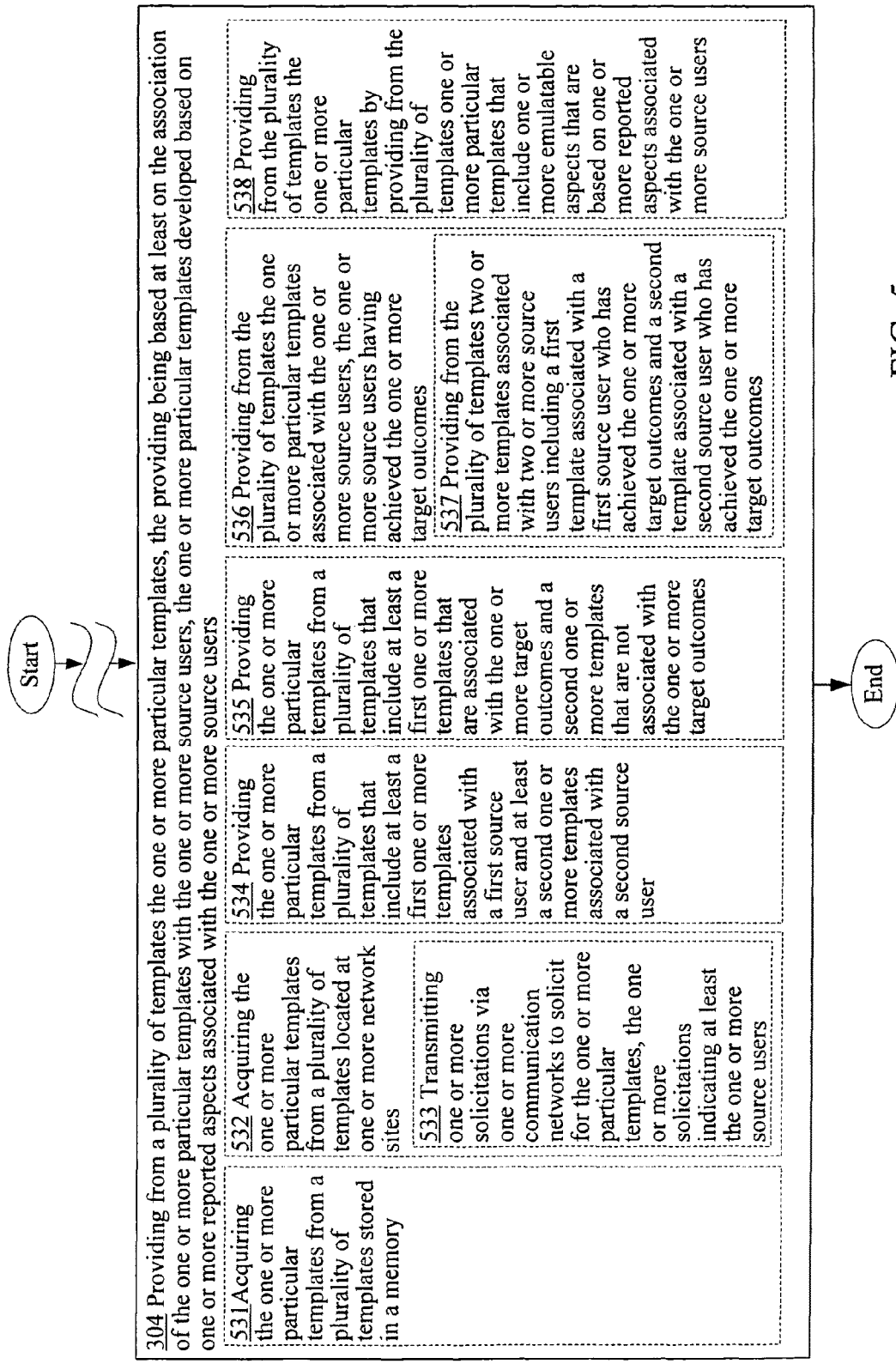
FIG. 5a is a high-level logic flowchart of a process depicting alternate implementations of the template providing operation 304 of FIG. 3.

Referring back to FIG. 3, the template providing operation 304 may be implemented in a number of different ways in various implementations. For example, in some implementations, the template providing operation 304 may include an operation 531 for acquiring the one or more particular templates from a plurality of templates stored in a memory as depicted in FIG. 5a. For instance, the memory template acquiring module 202 of the computing device 10 acquiring the one or more particular templates 18 from a plurality of templates 17 stored in a memory 116 (e.g., volatile and/or non-volatile memory).

In the same or different implementations the template providing operation 304 may include an operation 532 for acquiring the one or more particular templates from a plurality of templates located at one or more network sites as depicted in FIG. 5a. For instance, the network template acquiring module 204 (see FIG. 2a) of the computing device 10 acquiring the one or more particular templates 18 from a plurality of templates 17 located at one or more network sites. Note that in order to avoid confusion, the computing device 10 of FIGS. 1a and 1b is not shown acquiring the one or more particular templates 18 as is the case in operation 532 but instead is only depicted as transmitting the one or more particular templates 18 in order to, for example, present the one or more particular templates 18.

Operation 532 may, in turn, further include an operation 533 for transmitting one or more solicitations via one or more communication networks to solicit for the one or more particular templates, the one or more solicitations indicating at least the one or more source users as depicted in FIG. 5a. For instance, the solicitation transmitting module 206 (see FIG. 2a) of the computing device 10, when the computing device 10 is an end user device, transmitting one or more solicitations via one or more communication networks 50 to solicit for the one or more particular templates 18, the one or more solicitations indicating at least the one or more source users 2\*. Note again that for purpose of clarity and ease of illustration, FIGS. 1a and 1b do not show the one or more solicitations being transmitted by the computing device 10.

In various cases, the plurality of templates 17 that the one or more particular templates 18 may be provided from may be associated with a plurality of source users 2*. For example, in the same or different implementations, the template providing operation 304 of FIG. 3 may include an operation 534 for providing the one or more particular templates from a plurality of templates that include at least a first one or more templates associated with a first source user and at least a second one or more templates associated with a second source user as depicted in FIG. 5a. For instance, the particular template providing module 104 of the computing device 10 providing the one or more particular templates 18 from a plurality of templates 17 that include at least a first one or more templates 17 associated with a first source user 2a and at least a second one or more templates 17 associated with a second source user 2b.

In the same or different implementations, the template providing operation 304 of FIG. 3 may include an operation 535 for providing the one or more particular templates from a plurality of templates that include at least a first one or more templates that are associated with the one or more target outcomes and a second one or more templates that are not associated with the one or more target outcomes as depicted in FIG. 5a. For instance, the particular template providing module 104 of the computing device 10 providing the one or more particular templates 18 from a plurality of templates 17 that include at least a first one or more templates 17 that are associated with the one or more target outcomes 14 and a second one or more templates 17 that are not associated with the one or more target outcomes 14.

In the same or different implementations, the template providing operation 304 of FIG. 3 may include an operation 536 for providing from the plurality of templates the one or more particular templates associated with the one or more source users, the one or more source users having achieved the one or more target outcomes as depicted in FIG. 5a. For instance, the particular template providing module 104 of the computing device 10 providing from the plurality of templates 17 the one or more particular templates 18 associated with the one or more source users 2*, the one or more source users 2* having achieved the one or more target outcomes 14.

In some implementations, operation 536 may further include an operation 537 for providing from the plurality of templates two or more templates associated with two or more source users including a first template associated with a first source user who has achieved the one or more target outcomes and a second template associated with a second source user who has achieved the one or more target outcomes as depicted in FIG. 5a. For instance, the particular template providing module 104 of the computing device 10 providing from the plurality of templates 17 two or more templates 17 associated with two or more source users 2* including a first template 17 associated with a first source user 2a who has achieved the one or more target outcomes 14 and a second template 17 associated with a second source user 2b who has also achieved the one or more target outcomes 14.

In some implementations, the template providing operation 304 of FIG. 3 may include an operation 538 for providing from the plurality of templates the one or more particular templates by providing from the plurality of templates one or more particular templates that include one or more emulatable aspects that are based on one or more reported aspects associated with the one or more source users as depicted in FIG. 5a. For instance, the particular template providing module 104 of the computing device 10 providing from the plurality of templates 17 the one or more particular templates 18 by providing from the plurality of templates 17 one or more particular templates 18 that include one or more emulatable aspects 12 that are based on one or more reported aspects 15 (e.g., as reported through microblog entries or status reports) associated with the one or more source users 2*.

Figure 5B:
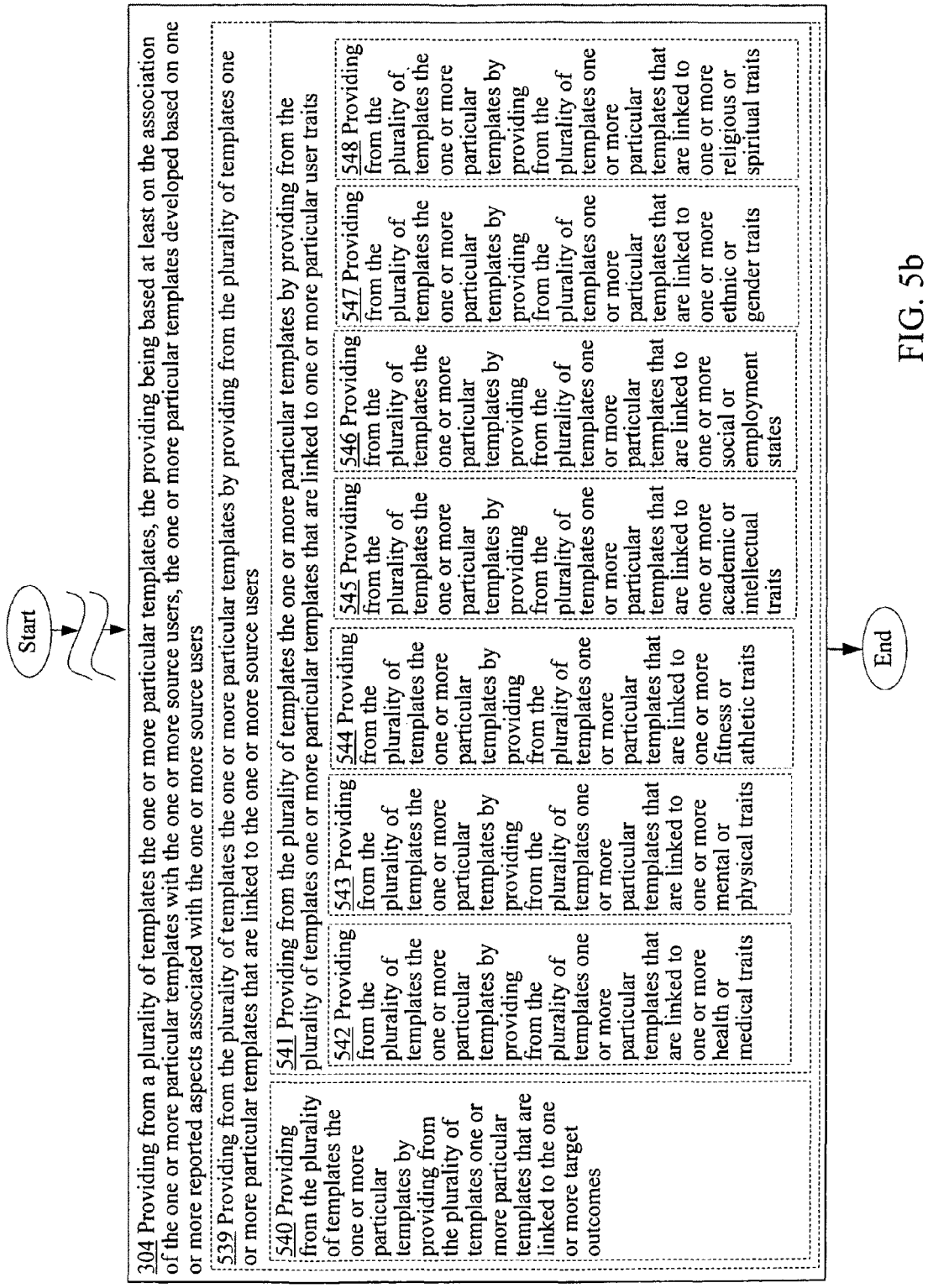
FIG. 5b is a high-level logic flowchart of a process depicting alternate implementations of the template providing operation 304 of FIG. 3.

The one or more particular templates 18 provided through the template providing operation 304 of FIG. 3 may be at least linked to the one or more source users 2*. For example, in various implementations, the template providing operation 304 may include an operation 539 for providing from the plurality of templates the one or more particular templates by providing from the plurality of templates one or more particular templates that are linked to the one or more source users as depicted in FIG. 5b. For instance, the particular template providing module 104 of the computing device 10 providing from the plurality of templates 17 the one or more particular templates 18 by providing (e.g., acquiring, finding, or identifying) from the plurality of templates 17 one or more particular templates 18 that are linked (e.g., associated with) to at least the one or more source users 2*. In some cases, the one or more particular templates 18 may be linked to the one or more source users 2* by including or being hyperlinked to one or more source user identifiers 226 (see FIG. 2b) such as a name, an image, a location (which may be continuously updated), and so forth, that matches with identifiers for the one or more source users 2*.

In various implementations, operation 539 may further include one or more additional operations in various alternative implementations. For example, in some implementations, operation 539 may include an operation 540 for providing from the plurality of templates the one or more particular templates by providing from the plurality of templates one or more particular templates that are linked to the one or more target outcomes as depicted in FIG. 5b. For instance, the particular template providing module 104 of the computing device 10 providing from the plurality of templates 17 the one or more particular templates 18 by providing from the plurality of templates 17 one or more particular templates 18 that are linked to (e.g., associated with) the one or more target outcomes 14.

In the same or different implementations, operation 539 may include an operation 541 for providing from the plurality of templates the one or more particular templates by providing from the plurality of templates one or more particular templates that are linked to one or more particular user traits as depicted in FIG. 5b. For instance, the particular template providing module 104 of the computing device 10 providing from the plurality of templates 17 the one or more particular templates 18 by providing from the plurality of templates 17 one or more particular templates 18 that are linked to (e.g., associated with) one or more particular user traits.

In other words, providing one or more particular templates 18 that are associated with one or more source users 2* who may be linked to one or more particular user traits (e.g., ethnicity, health issues, social states, and so forth). That is, an end user 4* in most cases, will likely prefer obtaining templates 17 of source users 2* who may have similar traits as the end user 4*. In some cases, the linking of the one or more particular templates 18 to the one or more particular user traits may be by including into or associating the one or more particular templates 18 with indications of one or more source user traits (see source user traits 228 in FIG. 2b).

Various types of user traits may be linked to the one or more particular templates 18 that may be provided. For example, in some implementations, operation 541 may include an operation 542 for providing from the plurality of templates the one or more particular templates by providing from the plurality of templates one or more particular templates that are linked to one or more health or medical traits as depicted in FIG. 5b. For instance, the particular template providing module 104 of the computing device 10 providing from the plurality of templates 17 the one or more particular templates 18 by providing from the plurality of templates 17 one or more particular templates 18 that are linked to one or more health or medical traits (e.g., the one or more source users 2* associated with the one or more particular templates 18 being linked to cancer or diabetes).

In the same or different implementations, operation 541 may include an operation 543 for providing from the plurality of templates the one or more particular templates by providing from the plurality of templates one or more particular templates that are linked to one or more mental or physical traits as depicted in FIG. 5b. For instance, the particular template providing module 104 of the computing device 10 providing from the plurality of templates 17 the one or more particular templates 18 by providing from the plurality of templates 17 one or more particular templates 18 that are linked to one or more mental or physical traits (e.g., the one or more source users 2* associated with the one or more particular templates 18 being linked to bi-polar personality, obesity, short stature, and so forth).

In the same or different implementations, operation 541 may include an operation 544 for providing from the plurality of templates the one or more particular templates by providing from the plurality of templates one or more particular templates that are linked to one or more fitness or athletic traits as depicted in FIG. 5b. For instance, the particular template providing module 104 of the computing device 10 providing from the plurality of templates 17 the one or more particular templates 18 by providing from the plurality of templates 17 one or more particular templates 18 that are linked to one or more fitness or athletic traits (e.g., the one or more source users 2* associated with the one or more particular templates 18 being linked to a golf handicap of 36 or linked to poor cardiovascular shape).

In the same or different implementations, operation 541 may include an operation 545 for providing from the plurality of templates the one or more particular templates by providing from the plurality of templates one or more particular templates that are linked to one or more academic or intellectual traits as depicted in FIG. 5b. For instance, the particular template providing module 104 of the computing device 10 providing from the plurality of templates 17 the one or more particular templates 18 by providing from the plurality of templates 17 one or more particular templates 18 that are linked to one or more academic or intellectual traits (e.g., the one or more source users 2* associated with the one or more particular templates 18 being linked to a particular University).

In the same or different implementations, operation 541 may include an operation 546 for providing from the plurality of templates the one or more particular templates by providing from the plurality of templates one or more particular templates that are linked to one or more social or employment states as depicted in FIG. 5b. For instance, the particular template providing module 104 of the computing device 10 providing from the plurality of templates 17 the one or more particular templates 18 by providing from the plurality of templates 17 one or more particular templates 18 that are linked to one or more social or employment states (e.g., the one or more source users 2* associated with the one or more particular templates 18 being linked to being divorced or being under employed).

In the same or different implementations, operation 541 may include an operation 547 for providing from the plurality of templates the one or more particular templates by providing from the plurality of templates one or more particular templates that are linked to one or more ethnic or gender traits as depicted in FIG. 5b. For instance, the particular template providing module 104 of the computing device 10 providing from the plurality of templates 17 the one or more particular templates 18 by providing from the plurality of templates 17 one or more particular templates 18 that are linked to one or more ethnic or gender traits (e.g., the one or more source users 2* associated with the one or more particular templates 18 being linked to a multi-racial background).

In the same or different implementations, operation 541 may include an operation 548 for providing from the plurality of templates the one or more particular templates by providing from the plurality of templates one or more particular templates that are linked to one or more religious or spiritual traits as depicted in FIG. 5b. For instance, the particular template providing module 104 of the computing device 10 providing from the plurality of templates 17 the one or more particular templates 18 by providing from the plurality of templates 17 one or more particular templates 18 that are linked to one or more religious or spiritual traits (e.g., the one or more source users 2* associated with the one or more particular templates 18 being linked to after-life beliefs).

Figure 5C:
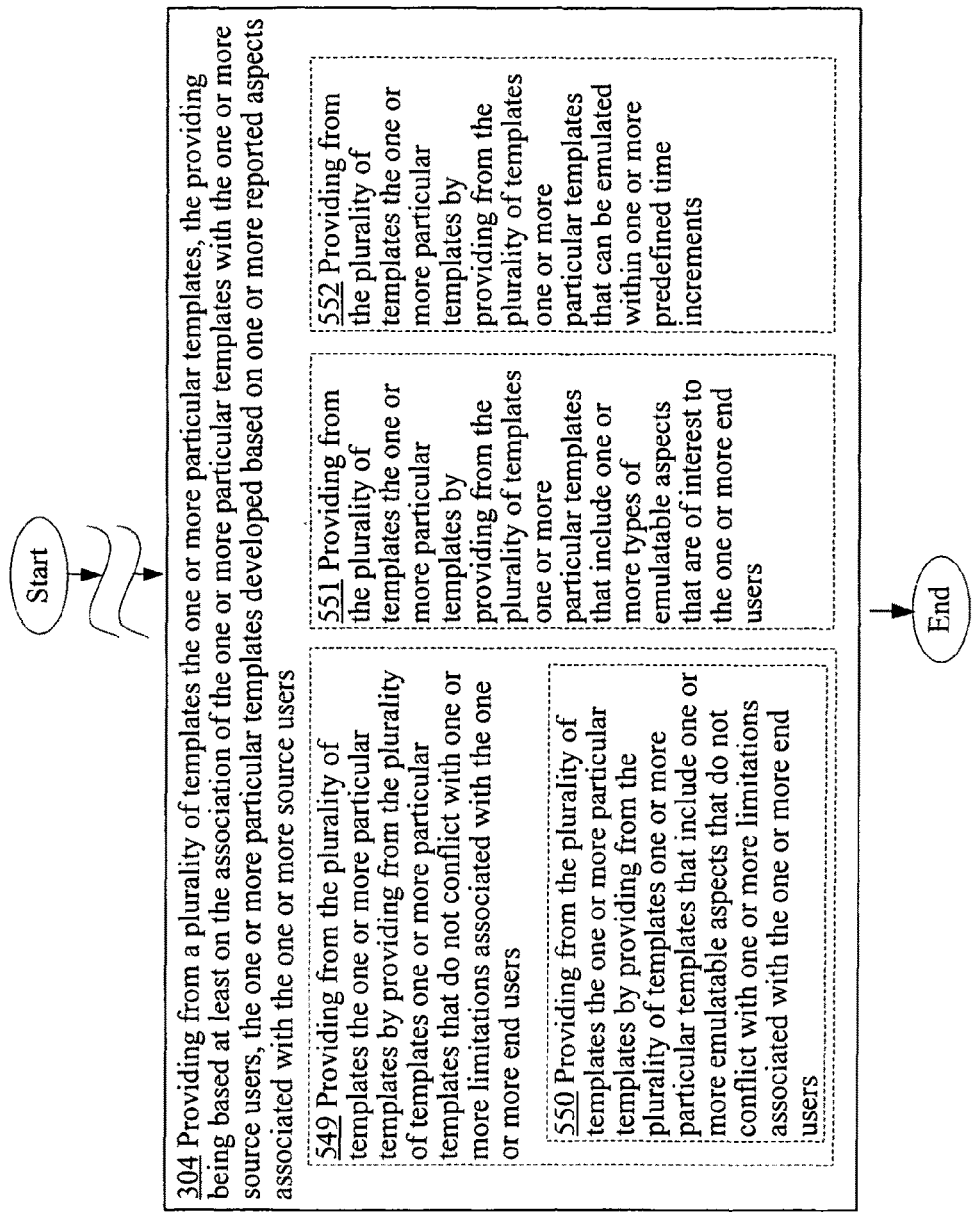
FIG. 5c is a high-level logic flowchart of a process depicting alternate implementations of the template providing operation 304 of FIG. 3.

In some implementations, the template providing operation 304 of FIG. 3 for providing one or more particular templates 18 may include an operation 549 for providing from the plurality of templates the one or more particular templates by providing from the plurality of templates one or more particular templates that do not conflict with one or more limitations associated with the one or more end users as depicted in FIG. 5c. For instance, the particular template providing module 104 of the computing device 10 providing from the plurality of templates 17 the one or more particular templates 18 by providing from the plurality of templates 17 one or more particular templates 18 that do not conflict with one or more limitations (e.g., contextual limitations, physical limitations, legal limitations, and so forth) associated with one or more end users 4*.

In various implementations, operation 549 may further include an operation 550 for providing from the plurality of templates the one or more particular templates by providing from the plurality of templates one or more particular templates that include one or more emulatable aspects that do not conflict with one or more limitations associated with the one or more end users as depicted in FIG. 5c. For instance, the particular template providing module 104 of the computing device 10 providing from the plurality of templates 17 the one or more particular templates 18 by providing from the plurality of templates 17 one or more particular templates 18 that include one or more emulatable aspects 12 that do not conflict with one or more limitations associated with the one or more end users 4*. For example, if the one or more end users 4* are vegans, than the one or more particular templates 18 to be provided should not include any activities related to consumption of meats.

In some implementations, the template providing operation 304 of FIG. 3 may include an operation 551 for providing from the plurality of templates the one or more particular templates by providing from the plurality of templates one or more particular templates that include one or more types of emulatable aspects that are of interest to the one or more end users as depicted in FIG. 5c. For instance, the particular template providing module 104 of the computing device 10 providing from the plurality of templates 17 the one or more particular templates 18 by providing from the plurality of templates 17 one or more particular templates 18 that include one or more types of emulatable aspects 12 that are of interest to the one or more end users 4*.

In some implementations, the template providing operation 304 of FIG. 3 may include an operation 552 for providing from the plurality of templates the one or more particular templates by providing from the plurality of templates one or more particular templates that can be emulated within one or more predefined time increments as depicted in FIG. 5c. For instance, the particular template providing module 104 of the computing device 10 providing from the plurality of templates 17 the one or more particular templates 18 by providing from the plurality of templates 17 one or more particular templates 18 that can be emulated within one or more predefined time increments. For example, if an end user 4* is only interested in templates 17 that can be executed within a month and that results in a weight loss of 20 pounds or more than any templates 17 for losing at least 20 pounds of weight that takes more than a month to execute would be excluded from being provided.

Figure 5D:
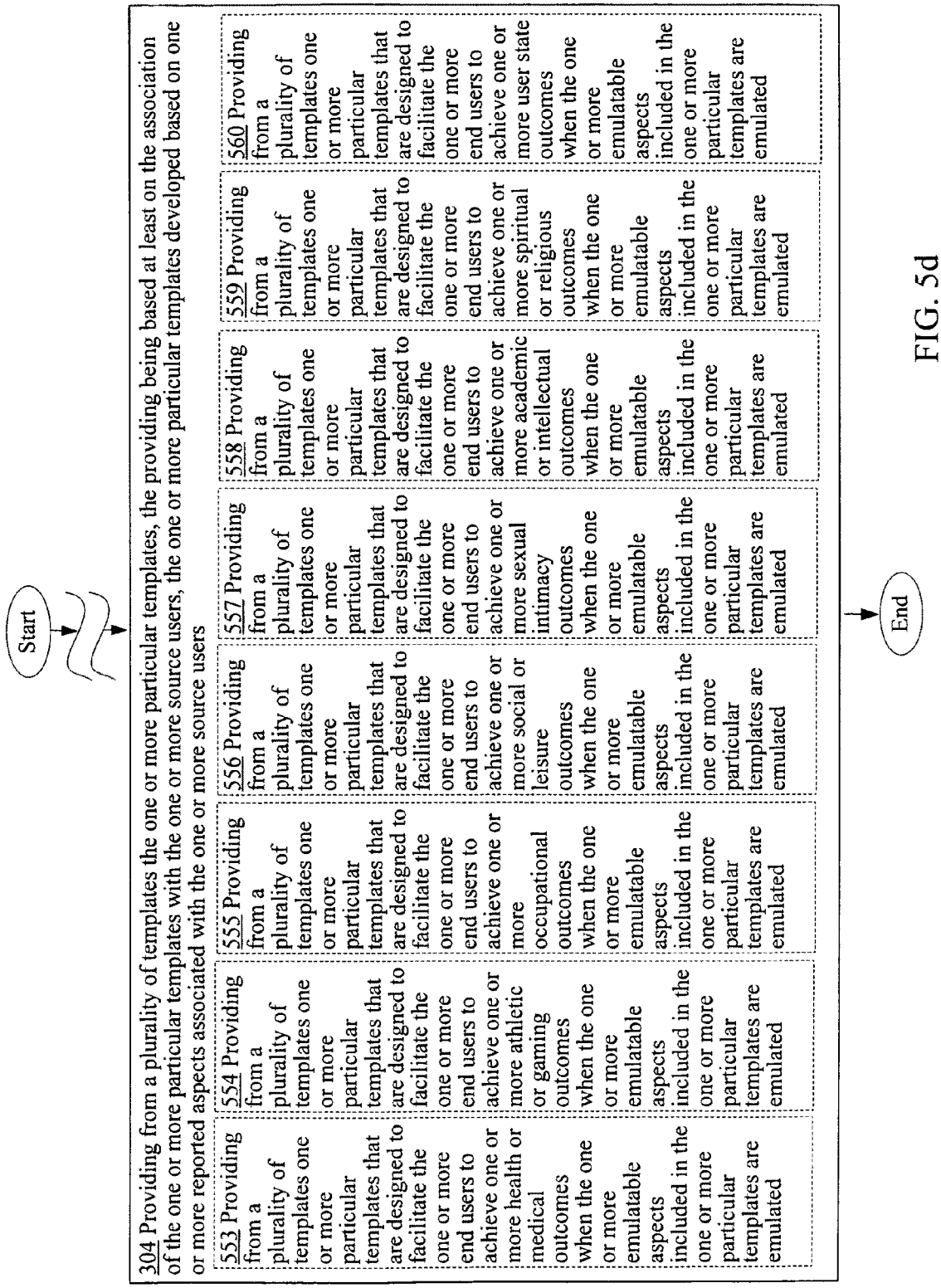
FIG. 5d is a high-level logic flowchart of a process depicting alternate implementations of the template providing operation 304 of FIG. 3.

Various types of particular templates 18 may be provided by the template providing operation 304 of FIG. 3 in various alternative implementations. For example, in some implementations, the template providing operation 304 may include an operation 553 for providing from a plurality of templates one or more particular templates that are designed to facilitate the one or more end users to achieve one or more health or medical outcomes when the one or more emulatable aspects included in the one or more particular templates are emulated as depicted in FIG. 5d. For instance, the particular template providing module 104 of the computing device 10 providing from a plurality of templates 17 one or more particular templates 18 that are designed to facilitate the one or more end users 4* to achieve one or more health or medical outcomes (e.g., reduce blood pressure level or increase red blood cell count) when the one or more emulatable aspects 12 included in the one or more particular templates 18 are emulated.

In the same or different implementations, the template providing operation 304 may include an operation 554 for providing from a plurality of templates one or more particular templates that are designed to facilitate the one or more end users to achieve one or more athletic or gaming outcomes when the one or more emulatable aspects included in the one or more particular templates are emulated as depicted in FIG. 5d. For instance, the particular template providing module 104 of the computing device 10 providing from a plurality of templates 17 one or more particular templates 18 that are designed to facilitate the one or more end users 4* to achieve one or more athletic or gaming outcomes (e.g., win a chess tournament) when the one or more emulatable aspects 12 (e.g., practice two hours every other day) included in the one or more particular templates 18 are emulated.

In the same or different implementations, the template providing operation 304 may include an operation 555 for providing from a plurality of templates one or more particular templates that are designed to facilitate the one or more end users to achieve one or more occupational outcomes when the one or more emulatable aspects included in the one or more particular templates are emulated as depicted in FIG. 5d. For instance, the particular template providing module 104 of the computing device 10 providing from a plurality of templates 17 one or more particular templates 18 that are designed to facilitate the one or more end users 4* to achieve one or more occupational outcomes (e.g., obtain a promotion) when the one or more emulatable aspects 12 included in the one or more particular templates 18 are emulated.

In the same or different implementations, the template providing operation 304 may include an operation 556 for providing from a plurality of templates one or more particular templates that are designed to facilitate the one or more end users to achieve one or more social or leisure outcomes when the one or more emulatable aspects included in the one or more particular templates are emulated as depicted in FIG. 5d. For instance, the particular template providing module 104 of the computing device 10 providing from a plurality of templates 17 one or more particular templates 18 that are designed to facilitate the one or more end users 4* to achieve one or more social or leisure outcomes (e.g., going out on a date every weekend) when the one or more emulatable aspects 12 included in the one or more particular templates 18 are emulated.

In the same or different implementations, the template providing operation 304 may include an operation 557 for providing from a plurality of templates one or more particular templates that are designed to facilitate the one or more end users to achieve one or more sexual intimacy outcomes when the one or more emulatable aspects included in the one or more particular templates are emulated as depicted in FIG. 5d. For instance, the particular template providing module 104 of the computing device 10 providing from a plurality of templates 17 one or more particular templates 18 that are designed to facilitate the one or more end users 4* to achieve one or more sexual intimacy outcomes when the one or more emulatable aspects 12 included in the one or more particular templates 18 are emulated.

In the same or different implementations, the template providing operation 304 may include an operation 558 for providing from a plurality of templates one or more particular templates that are designed to facilitate the one or more end users to achieve one or more academic or intellectual outcomes when the one or more emulatable aspects included in the one or more particular templates are emulated as depicted in FIG. 5d. For instance, the particular template providing module 104 of the computing device 10 providing from a plurality of templates 17 one or more particular templates 18 that are designed to facilitate the one or more end users 4* to achieve one or more academic or intellectual outcomes (e.g., being accepted for enrollment to a particular University) when the one or more emulatable aspects 12 included in the one or more particular templates 18 are emulated.

In the same or different implementations, the template providing operation 304 may include an operation 559 for providing from a plurality of templates one or more particular templates that are designed to facilitate the one or more end users to achieve one or more spiritual or religious outcomes when the one or more emulatable aspects included in the one or more particular templates are emulated as depicted in FIG. 5d. For instance, the particular template providing module 104 of the computing device 10 providing from a plurality of templates 17 one or more particular templates 18 that are designed to facilitate the one or more end users 4* to achieve one or more spiritual or religious outcomes when the one or more emulatable aspects 12 included in the one or more particular templates 18 are emulated.

In the same or different implementations, the template providing operation 304 may include an operation 560 for providing from a plurality of templates one or more particular templates that are designed to facilitate the one or more end users to achieve one or more user state outcomes when the one or more emulatable aspects included in the one or more particular templates are emulated as depicted in FIG. 5d. For instance, the particular template providing module 104 of the computing device 10 providing from a plurality of templates 17 one or more particular templates 18 that are designed to facilitate the one or more end users 4* to achieve one or more user state outcomes (e.g., being content or satisfied, or being happy) when one or more emulatable aspects 12 included in the one or more particular templates 18 are emulated.

Figure 6:
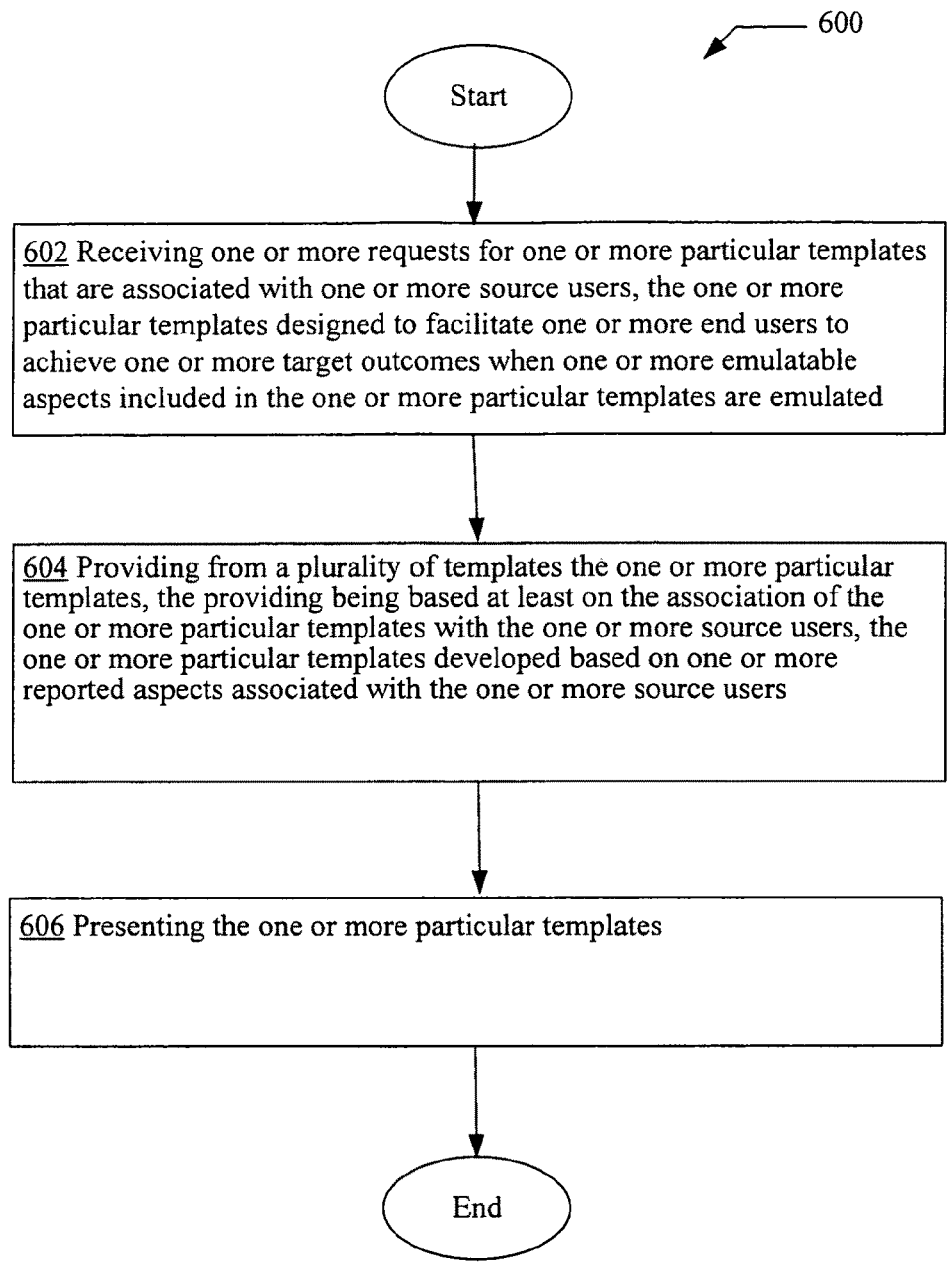
FIG. 6 is a high-level logic flowchart of another process.

Referring to FIG. 6 illustrating another operational flow 600 in accordance with various embodiments. Operational flow 600 includes certain operations that mirror the operations included in the operational flow 300 of FIG. 3. These operations include a request receiving operation 602 and a template providing operation 604 that corresponds to and mirror the request receiving operation 302 and the template providing operation 304, respectively, of FIG. 3.

In addition, operational flow 300 includes a template presenting operation 606 for presenting the one or more particular templates as depicted in FIG. 6. For instance, the presentation module 106 of the computing device 10 presenting the one or more particular templates 18 to, for example, one or more end users 4*, to one or more source users 2*, to one or more third parties 6, and/or to one or more network servers 60.

Figure 7:
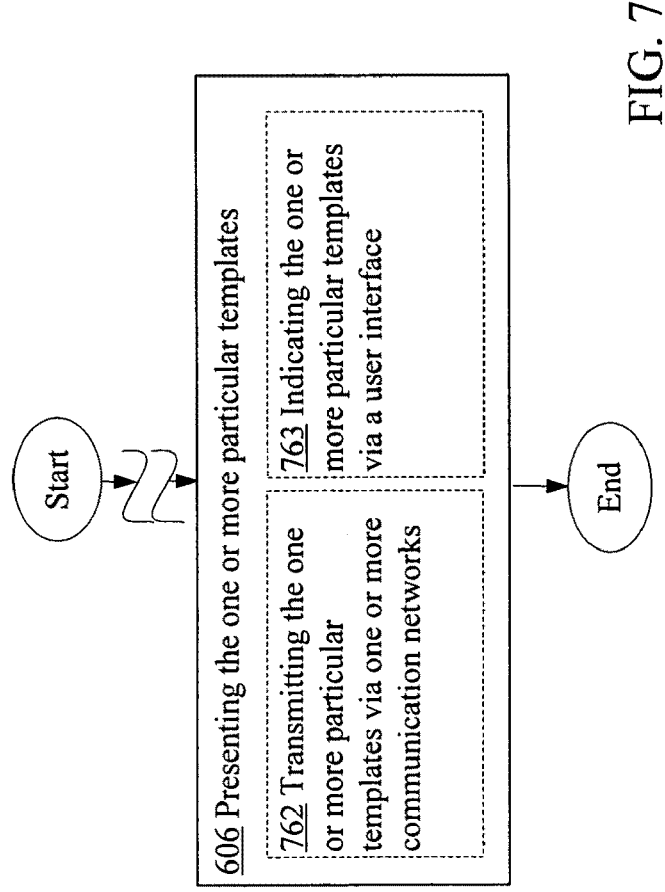
FIG. 7 is a high-level logic flowchart of a process depicting alternate implementations of the presentation operation 606 of FIG. 6.

In some implementations, the template presentation operation 606 may include an operation 762 for transmitting the one or more particular templates via one or more communication networks as depicted in FIG. 7. For instance, the transmission module 236 of the computing device 10 transmitting the one or more particular templates 18 via at least one of one or more communication networks 50.

In the same or different implementations, the template presentation operation 606 may include an operation 763 for indicating the one or more particular templates via a user interface as depicted in FIG. 7. For instance, the user interface indication module 238 indicating (e.g., displaying or audioally indicating) the one or more particular templates 18 via a user interface 120 (e.g., a display monitor, a touch screen, and/or one or more audio speakers).

Figure 8:
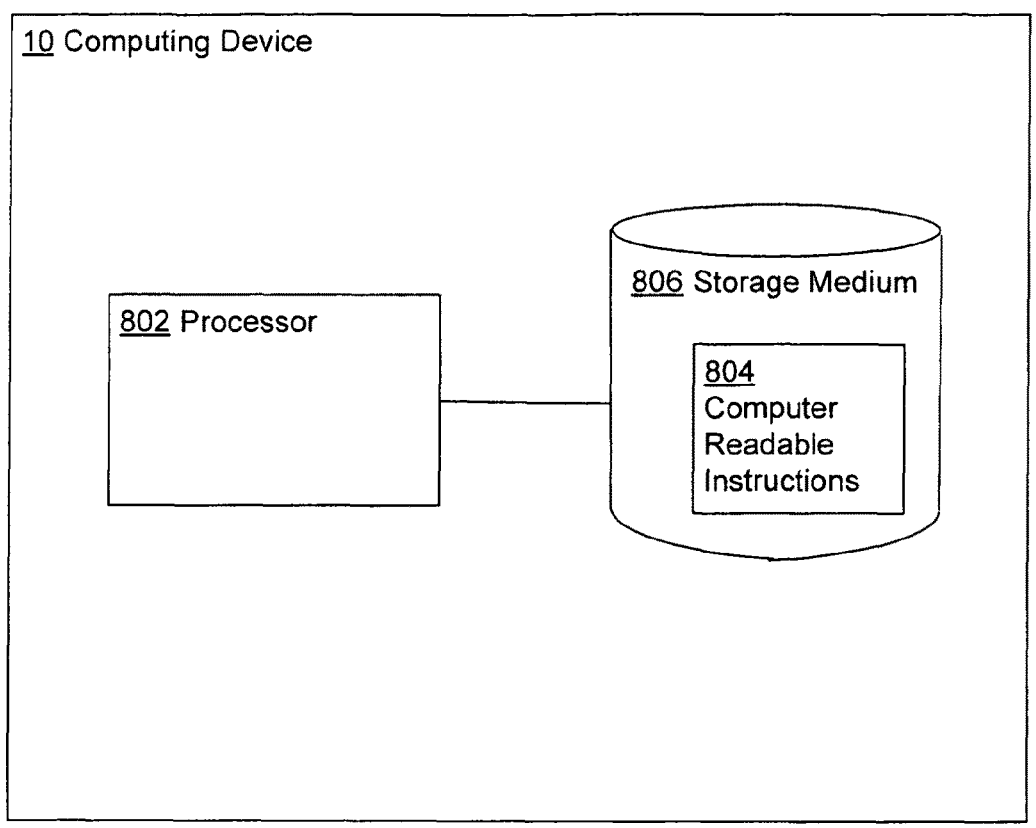
FIG. 8 is another high-level block diagram showing one implementation of the computing device 10 of FIG. 1b.

Turning now to FIG. 8, which is a high-level block diagram illustrating a particular implementation of the computing device 10 of FIG. 1b. As illustrated, the computing device 10 may include a processor 802 (e.g., microprocessor, controller, and so forth) coupled to storage medium 806 (e.g., volatile or non-volatile memory). The storage medium 806 may store computer readable instructions 804 (e.g., computer program product). The processor 802, in various implementations, may execute the computer readable instructions 804 in order to execute one or more operations described above and as illustrated in FIGS. 3, 4a, 4b, 4c, 5a, 5b, 5c, and 5d.

For example, the processor 802 may execute the computer readable instructions 804 in order to receive one or more requests 16 for one or more particular templates 18 that are associated with one or more source users 2*, the one or more particular templates 18 designed to facilitate one or more end users 4* to achieve one or more target outcomes 14 when one or more emulatable aspects 12 included in the one or more particular templates 18 are emulated; and/or to provide from a plurality of templates 17 the one or more particular templates 18, the providing being based at least on the association of the one or more particular templates 18 with the one or more source users 2*, the one or more particular templates 18 developed based on one or more reported aspects 15 associated with the one or more source users 2* as illustrated by the operational flow 300 of FIG. 3.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:
   a request receiving module configured to receive one or more requests for one or more particular templates that are associated with one or more source users and designed to facilitate one or more end users to achieve one or more target outcomes when one or more emulatable aspects included in the one or more particular templates are emulated; and a particular template providing module configured to provide the one or more particular templates from a plurality of templates based at least on the association of the one or more particular templates with the one or more source users, the one or more particular templates developed based on one or more reported aspects related to the one or more source users, wherein said particular template providing module comprises:

a particular template providing module configured to provide the one or more particular templates by providing one or more particular templates that do not conflict with one or more limitations associated with the one or more end users.

2. The system of claim 1, wherein said request receiving module comprises:

a request receiving module configured to receive the one or more requests for the one or more particular templates including one or more requests that indicate the one or more source users.

3. The system of claim 2, wherein said request receiving module comprises:

a request receiving module configured to receive the one or more requests that indicate the one or more source users including identification data to identify at least one of the one or more source users.

4. The system of claim 3, wherein said request receiving module comprises:

a request receiving module configured to receive the one or more requests that indicate the one or more source users including image data to identify at least one of the one or more source users.

5. The system of claim 3, wherein said request receiving module comprises:

a request receiving module configured to receive the one or more requests that indicate the one or more source users including location data to identify at least one of the one or more source users.

6. The system of claim 3, wherein said request receiving module comprises:

a request receiving module configured to receive the one or more requests that indicate the one or more source users including radio frequency identification (RFID) data to identify at least one of the one or more source users.

7. The system of claim 3, wherein said request receiving module comprises:

a request receiving module configured to receive the one or more requests that indicate the one or more source users including audio data to identify at least one of the one or more source users.

8. The system of claim 3, wherein said request receiving module comprises:

a request receiving module configured to receive the one or more requests that indicate the one or more source users including username data to identify at least one of the one or more source users.

9. The system of claim 1, wherein said request receiving module comprises:

a request receiving module configured to receive one or more requests that indicate one or more source user groups.

10. The system of claim 1, wherein said request receiving module comprises:

a request receiving module configured to receive one or more requests that indicate one or more traits associated with at least one end user.

11. The system of claim 1, wherein said request receiving module comprises:

a request receiving module configured to receive one or more requests that indicate one or more types of aspects that are of interest to at least one end user.

12. The system of claim 1, wherein said request receiving module comprises:

a request receiving module configured to receive one or more requests that indicate one or more limitations associated with at least one end user.

13. The system of claim 1, wherein said request receiving module comprises:

a request receiving module configured to receive one or more requests that indicate at least one of the one or more target outcomes.

14. The system of claim 1, wherein said particular template providing module comprises:

a network template acquiring module configured to acquire the one or more particular templates from one or more network sites.

15. The system of claim 14, wherein said network template acquiring module comprises:

a solicitation transmitting module configured to transmit, via one or more communication networks, one or more solicitations to solicit for the one or more particular templates, the one or more solicitations indicating at least the one or more source users.

16. The system of claim 1, wherein said particular template providing module comprises:

a particular template providing module configured to provide the one or more particular templates including at least a first one or more particular templates associated with a first source user and at least a second one or more particular templates associated with a second source user.

17. The system of claim 1, wherein said particular template providing module comprises:

a particular template providing module configured to provide the one or more particular templates including at least a first one or more particular templates that are associated with the one or more target outcomes and a second one or more particular templates that are not associated with the one or more target outcomes.

18. The system of claim 1, wherein said particular template providing module comprises:

a particular template providing module configured to provide the one or more particular templates associated with the one or more source users, the one or more source users having achieved the one or more target outcomes.

19. The system of claim 18, wherein said particular template providing module comprises:

a particular template providing module configured to provide two or more templates associated with two or more source users including a first template associated with a first source user who has achieved the one or more target outcomes and a second template associated with a second source user who has achieved the one or more target outcomes.

20. The system of claim 1, wherein said particular template providing module comprises:

a particular template providing module configured to provide the one or more particular templates by providing one or more particular templates that include one or more emulatable aspects that are based on the one or more reported aspects related to the one or more source users.

21. The system of claim 1, wherein said particular template providing module comprises:

a particular template providing module configured to provide the one or more particular templates by providing one or more particular templates that are linked to the one or more source users.

22. The system of claim 21, wherein said particular template providing module comprises:
- a particular template providing module configured to provide the one or more particular templates by providing one or more particular templates that are linked to the one or more target outcomes.

23. The system of claim 21, wherein said particular template providing module comprises:
- a particular template providing module configured to provide the one or more particular templates by providing one or more particular templates that are linked to one or more particular user traits.

24. The system of claim 23, wherein said particular template providing module comprises:
- a particular template providing module configured to provide the one or more particular templates by providing one or more particular templates that are linked to one or more health or medical traits.

25. The system of claim 23, wherein said particular template providing module comprises:
- a particular template providing module configured to provide the one or more particular templates by providing one or more particular templates that are linked to one or more mental or physical traits.

26. The system of claim 23, wherein said particular template providing module comprises:
- a particular template providing module configured to provide the one or more particular templates by providing one or more particular templates that are linked to one or more fitness or athletic traits.

27. The system of claim 23, wherein said particular template providing module comprises:
- a particular template providing module configured to provide the one or more particular templates by providing one or more particular templates that are linked to one or more academic or intellectual traits.

28. The system of claim 23, wherein said particular template providing module comprises:
- a particular template providing module configured to provide the one or more particular templates by providing one or more particular templates that are linked to one or more social or employment states.

29. The system of claim 23, wherein said particular template providing module comprises:
- a particular template providing module configured to provide the one or more particular templates by providing one or more particular templates that are linked to one or more ethnic or gender traits.

30. The system of claim 23, wherein said particular template providing module comprises:
- a particular template providing module configured to provide the one or more particular templates by providing one or more particular templates that are linked to one or more religious or spiritual traits.

31. The system of claim 1, wherein said particular template providing module comprises:
- a particular template providing module configured to provide from the plurality of templates the one or more particular templates by providing one or more particular templates that include one or more emulatable aspects that do not conflict with one or more limitations associated with the one or more end users.

32. The system of claim 21, wherein said particular template providing module comprises:
- a particular template providing module configured to provide the one or more particular templates by providing one or more particular templates that can be successfully emulated within one or more predefined time increments.

33. The system of claim 1, wherein said particular template providing module comprises:
- a particular template providing module configured to provide one or more particular templates that are designed to facilitate the one or more end users to achieve one or more health or medical outcomes when the one or more emulatable aspects included in the one or more particular templates are emulated.

34. The system of claim 1, wherein said particular template providing module comprises:
- a particular template providing module configured to provide one or more particular templates that are designed to facilitate the one or more end users to achieve one or more athletic or gaming outcomes when the one or more emulatable aspects included in the one or more particular templates are emulated.

35. The system of claim 1, wherein said particular template providing module comprises:
- a particular template providing module configured to provide one or more particular templates that are designed to facilitate the one or more end users to achieve one or more occupational outcomes when the one or more emulatable aspects included in the one or more particular templates are emulated.

36. The system of claim 1, wherein said particular template providing module comprises:
- a particular template providing module configured to provide one or more particular templates that are designed to facilitate the one or more end users to achieve one or more occupational outcomes when the one or more emulatable aspects included in the one or more particular templates are emulated.

37. The system of claim 1, wherein said particular template providing module comprises:
- a particular template providing module configured to provide one or more particular templates that are designed to facilitate the one or more end users to achieve one or more sexual intimacy outcomes when the one or more emulatable aspects included in the one or more particular templates are emulated.

38. The system of claim 1, wherein said particular template providing module comprises:
- a particular template providing module configured to provide one or more particular templates that are designed to facilitate the one or more end users to achieve one or more academic or intellectual outcomes when the one or more emulatable aspects included in the one or more particular templates are emulated.

39. The system of claim 1, wherein said particular template providing module comprises:
- a particular template providing module configured to provide one or more particular templates that are designed to facilitate the one or more end users to achieve one or more spiritual or religious outcomes when the one or more emulatable aspects included in the one or more particular templates are emulated.

40. The system of claim 1, wherein said particular template providing module comprises:
- a particular template providing module configured to provide one or more particular templates that are designed to facilitate the one or more end users to achieve one or more user state outcomes when the one or more emulatable aspects included in the one or more particular templates are emulated.

41. The system of claim 1, further comprising:
a presentation module configured to present the one or more particular templates.

42. The system of claim 41, wherein said presentation module comprises:
a transmission module configured to transmit the one or more particular templates via one or more communication networks.

43. The system of claim 41, wherein said presentation module comprises:
a user interface indication module configured to indicate the one or more particular templates via a user interface.

44. A system, comprising:
circuitry for receiving one or more requests for one or more particular templates that are associated with one or more source users, the one or more particular templates designed to facilitate one or more end users to achieve one or more target outcomes when one or more emulatable aspects included in the one or more particular templates are emulated; and
circuitry for providing from a plurality of templates the one or more particular templates, the providing being based at least on the association of the one or more particular templates with the one or more source users, the one or more particular templates developed based on one or more reported aspects associated with the one or more source users, wherein said circuitry for providing from a plurality of templates the one or more particular templates, the providing being based at least on the association of the one or more particular templates with the one or more source users, the one or more particular templates developed based on one or more reported aspects associated with the one or more source users comprises:
circuitry for providing from the plurality of templates the one or more particular templates by providing from the plurality of templates one or more particular templates that do not conflict with one or more limitations associated with the one or more end users.

45. An article of manufacture, comprising:
a non-transitory storage medium bearing:
one or more instructions for receiving one or more requests for one or more particular templates that are associated with one or more source users, the one or more particular templates designed to facilitate one or more end users to achieve one or more target outcomes when one or more emulatable aspects included in the one or more particular templates are emulated; and
one or more instructions for providing from a plurality of templates the one or more particular templates, the providing being based at least on the association of the one or more particular templates with the one or more source users, the one or more particular templates developed based on one or more reported aspects associated with the one or more source users, wherein said one or more instructions for providing from a plurality of templates the one or more particular templates, the providing being based at least on the association of the one or more particular templates with the one or more source users, the one or more particular templates developed based on one or more reported aspects associated with the one or more source users comprises:
one or more instructions for providing from the plurality of templates the one or more particular templates by providing from the plurality of templates one or more particular templates that do not conflict with one or more limitations associated with the one or more end users.

* * * * *